(12) United States Patent
Onimatsu

(10) Patent No.: US 10,046,530 B2
(45) Date of Patent: Aug. 14, 2018

(54) TIRE MANUFACTURING SYSTEM

(71) Applicant: SUMITOMO RUBBER INDUSTRIES LTD., Kobe-shi, Hyogo (JP)

(72) Inventor: Hiroyuki Onimatsu, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 244 days.

(21) Appl. No.: 14/427,560

(22) PCT Filed: Sep. 12, 2013

(86) PCT No.: PCT/JP2013/074737
§ 371 (c)(1),
(2) Date: Mar. 11, 2015

(87) PCT Pub. No.: WO2014/054404
PCT Pub. Date: Apr. 10, 2014

(65) Prior Publication Data
US 2015/0239188 A1    Aug. 27, 2015

(30) Foreign Application Priority Data

Oct. 2, 2012  (JP) ................................ 2012-220313
Oct. 2, 2012  (JP) ................................ 2012-220315

(51) Int. Cl.
*B29D 30/10*    (2006.01)
*B29D 30/00*    (2006.01)
(Continued)

(52) U.S. Cl.
CPC ....... *B29D 30/005* (2013.01); *B29D 30/0016* (2013.01); *B29D 30/10* (2013.01);
(Continued)

(58) Field of Classification Search
CPC ...... B29D 30/10; B29D 30/12; B29D 30/005; B29D 2030/105; B29D 2030/202;
(Continued)

(56) References Cited

U.S. PATENT DOCUMENTS 3,388,024 A *  6/1968  Black ..................... B29D 30/24
                                                           156/415
7,883,595 B2 *  2/2011  Nakada ................ B29D 30/005
                                                           156/111
(Continued)

FOREIGN PATENT DOCUMENTS

CN          102152484   *  8/2011  ............. B29D 30/08
EP          0 105 048 A1    4/1984
(Continued)

OTHER PUBLICATIONS

Machine generated Englsih language translation of JP 2012-166516 (original document dated Sep. 2012).*
(Continued)

*Primary Examiner* — Martin K Rogers
(74) *Attorney, Agent, or Firm* — Birch, Stewart, Kolasch & Birch, LLP

(57)    ABSTRACT

In order to make a tire factory more compact, this tire manufacturing system comprises a material storage zone, a green tire formation zone, a vulcanization zone, and an inspection and discharge zone. The green tire formation zone has a track and a plurality of work stations arranged along the track, where a green tire is formed by assembling a tire constituent member to an outer surface of a rigid core moving on the track at each of the work stations. A member assembly device that forms the tire constituent member by attaching a member material set for each of the tire constituent members to a surface of the rigid core, under an attachment condition determined according to size of the rigid core. The member assembly devices being arranged at
(Continued)

an outer peripheral side of the square-cornered U-shaped bending track and along the lateral track parts. The material storage zone is arranged adjacent to one lateral side of the square-cornered U-shaped bending track. The vulcanization zone is arranged adjacent to the other lateral side of the square-cornered U-shaped bending track. The inspection and discharge zone is arranged adjacent to the other lateral side of the vulcanization zone.

4 Claims, 21 Drawing Sheets

(51) Int. Cl.
    *B29D 30/20*    (2006.01)
    *B29K 105/24*   (2006.01)
(52) U.S. Cl.
    CPC ............... *B29D 2030/0038* (2013.01); *B29D 2030/202* (2013.01); *B29D 2030/204* (2013.01); *B29K 2105/24* (2013.01); *B29K 2105/246* (2013.01)
(58) Field of Classification Search
    CPC ........ B29D 2030/203; B29D 2030/204; B29D 2030/205; B29D 2030/208
    See application file for complete search history.

(56) References Cited

U.S. PATENT DOCUMENTS

| | | | | |
|---|---|---|---|---|
| 2001/0042586 | A1* | 11/2001 | Caretta | B29D 30/0016 156/130 |
| 2002/0153083 | A1 | 10/2002 | Takagi | |
| 2002/0174939 | A1* | 11/2002 | Caretta | B29D 30/00 156/118 |
| 2006/0169392 | A1 | 8/2006 | Akiyama et al. | |
| 2009/0223637 | A1* | 9/2009 | Marangoni | B29D 30/16 156/406.4 |
| 2010/0038016 | A1* | 2/2010 | Mancini | B29D 30/0601 156/111 |
| 2011/0126962 | A1* | 6/2011 | Mancini | B29D 30/20 156/110.1 |
| 2011/0198017 | A1* | 8/2011 | Marchini | B29C 47/0019 156/117 |

FOREIGN PATENT DOCUMENTS

| | | | | |
|---|---|---|---|---|
| EP | 1 568 475 A1 | | 8/2005 | |
| GB | 372043 A | | 5/1932 | |
| JP | 2000-351164 A | | 12/2000 | |
| JP | 2002-307570 A | | 10/2002 | |
| JP | 2009-6534 | * | 1/2009 | ............ B29D 30/08 |
| JP | 2009-160949 A | | 7/2009 | |
| JP | 2011-51329 A | | 3/2011 | |
| JP | 2011-143680 A | | 7/2011 | |
| JP | 2012-166516 | * | 9/2012 | ............ B29D 30/18 |
| WO | WO 2007/091315 A1 | | 8/2007 | |

OTHER PUBLICATIONS

Machine generated English language translation of CN 102152484 (original document dated Aug. 2011).*
Ch 16 Automated Proudction Lines Automation, Production Systems, and Computer-Integrated Manufacturing, Third Edition Mikell P. Groove, 2008.*
Machine generated English language translation of JP 2009-6534 (original document dated Jan. 2009) (Year: 2009).*

* cited by examiner

8(M4,M5,M6,M7,M10,M11)

9(M1,M2,M3)

9a
9b

7(M8,M9)

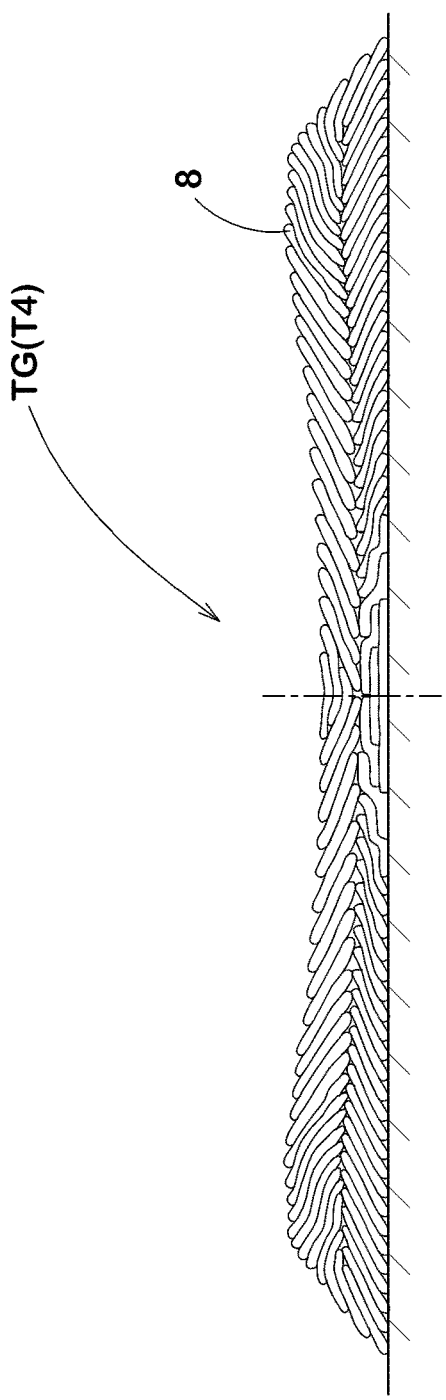

FIG.9(A)
FIG.9(B)
FIG.9(C)
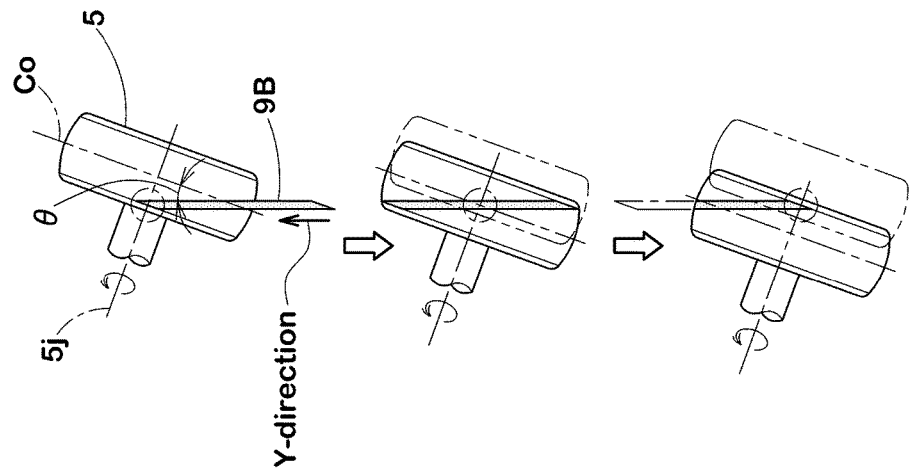
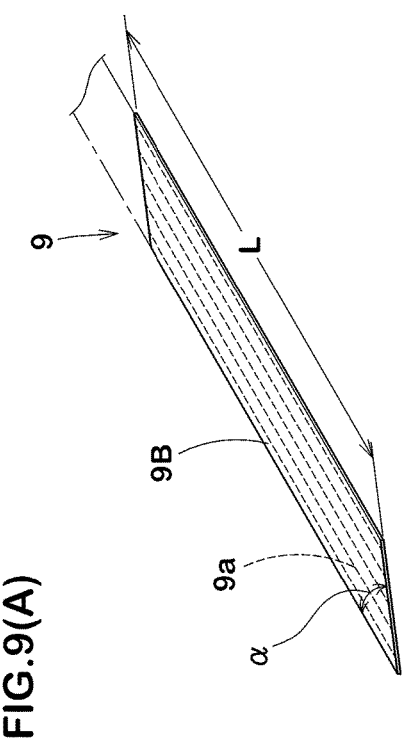
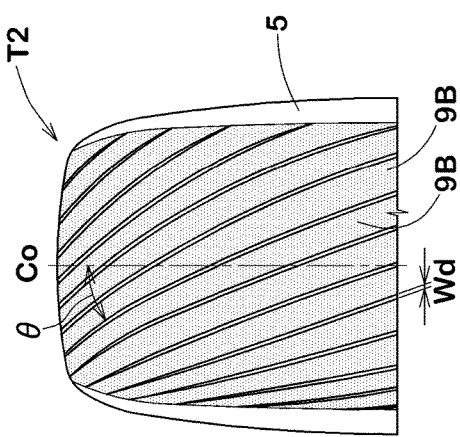

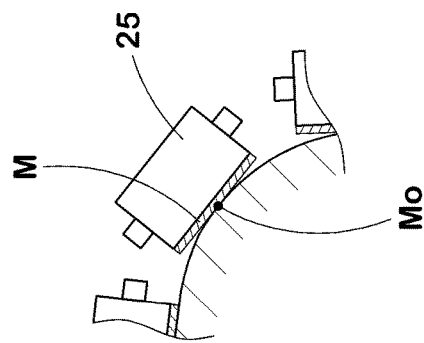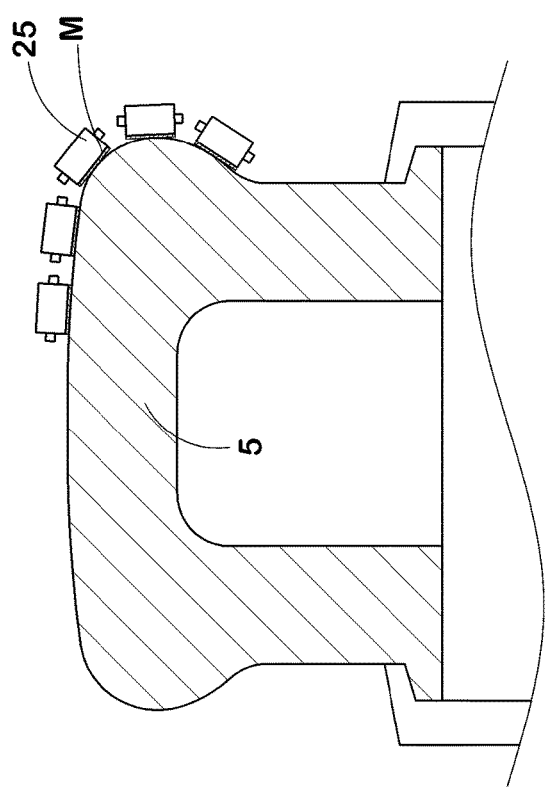
FIG.21(A)
FIG.21(B)

TIRE MANUFACTURING SYSTEM

TECHNICAL FIELD

The present invention relates to a tire manufacturing system that allows downsizing of a tire manufacturing plant.

BACKGROUND ART

Tire manufacturing plant is generally divided into a material storage zone, a green tire formation zone for forming green tires from materials supplied from the material storage zone, a vulcanization zone for vulcanizing the green tires, and an inspection and discharge zone for inspecting and discharging the vulcanized tires. In the green tire formation zone, conventionally, green tires are formed on a green tire formation line schematically shown in FIG. 14.

The green tire formation line includes a cylindrical formation drum (a), a shaping drum (b), and a tread formation drum (c). A cylindrical carcass body (ta) is formed by winding an inner liner rubber (t1) and a carcass ply (t2) on an outer peripheral surface of the formation drum (a). Reference numerals (d1) and (d2) denote conveyor-like servicers that supply the inner liner rubber (t1) and the carcass ply (t2), respectively. Bead cores (t3) with bead apex rubber are externally inserted into the cylindrical carcass body (ta). Reference numeral (d3) denotes a servicer that supplies the bead cores (t3). The cylindrical carcass body (ta) into which the bead cores (t3) are externally inserted is transferred from the formation drum (a) to the shaping drum (b) using a transferor (transfer equipment) not shown.

A cylindrical tread ring (tc) is formed by winding a belt ply (t4), a band ply (t5), and a tread rubber (t6) on an outer peripheral surface of the tread formation drum (c). Reference numerals (d4) to (d6) denote conveyor-like servicers that supply the belt ply (t4), the band ply (t5), and the tread rubber (t6), respectively. The tread ring (tc) is transferred using a transferor (transfer equipment) not shown from the tread formation drum (c) and held at the radial outside of the shaping drum (b). Reference numeral (d7) denotes a servicer that supplies a side wall rubber (t7) and the like.

At the shaping drum (b), the cylindrical carcass body (ta) is bulged in a toroidal shape between the bead cores (t3), (t3), and the bulged portion is joined to the inner peripheral surface of the tread ring (tc) to form a green tire. The green tire is removed from the shaping drum (b) and then carried to the vulcanization zone for vulcanization process.

On such a conventional green tire formation line as described above, various tire constituent members such as the inner liner rubber (t1), the carcass ply (t2), the bead core (t3), the belt ply (t4), the band ply (t5), the tread rubber (t6), the side wall rubber (t7) are processed in advance off the line to various widths, various cross-section shapes, or various cord angles according to a tire size. Thus, the conventional green tire formation line is suited for mass production of tires of one size.

On the other hand, the pre-processed tire constituent members are temporarily stored as semi-finished members in the material storage zone. The kinds of members increase in number according to tire sizes. This results in expansion of space for the material storage zone.

In addition, separate pre-processing lines are needed to pre-process the tire constituent members. Since the tire constituent members are wide, the servicers (d1) to (d7) for supplying them are also increased in size. This also brings about expansion of space for the green tire formation zone.

Since green tires of one size are mass-produced, the vulcanization process cannot keep up with the green tire production. Accordingly, a separate green tire storage space is needed to temporarily store green tires to be vulcanized. It is also necessary to increase the number of vulcanization molds in keeping with the mass production. The kinds of vulcanization molds increase in number even for tires of the same model according to tire sizes. This requires a separate space for storage of vulcanization molds of many sizes not used at present.

As a result, when a tire manufacturing plant is to be installed, the site space for the plant needs to be at least 25 m wide and 170 m long or more, which becomes a large hindrance for installation of the plant.

Patent Document 1 shown below can be exemplified as a document describing a prior technique related to a green tire formation line.

CITATION LIST

Patent Literature

Patent Document 1: Japanese Unexamined Patent Application Publication No. 2000-351164

SUMMARY OF INVENTION

Technical Problem

An object of the present invention is to provide a tire manufacturing system that allows downsizing of a tire manufacturing plant.

Solution to Problem

The present invention is a tire manufacturing system, including: a green tire formation zone for forming a green tire; a vulcanization zone for vulcanizing the green tire; an inspection and discharge zone for inspecting and discharging the vulcanized tire; and a material storage zone for storing materials for green tire formation, wherein the green tire formation zone has a track and a plurality of work stations arranged along the track, where a green tire is formed by assembling a tire constituent member to an outer surface of a rigid core moving on the track at each of the work stations, the track is composed of a horizontally-long, square-cornered U-shaped bending track including a pair of lateral track parts extended in a lateral direction and parallel to each other and a vertical track part connecting end portions of the lateral track parts at one lateral side, each of the work stations includes a member assembly device that forms the tire constituent member by attaching a member material set for each of the tire constituent members to a surface of the rigid core, under an attachment condition determined according to size of the rigid core, the member assembly devices being arranged at an outer peripheral side of the square-cornered U-shaped bending track and along the lateral track parts, the material storage zone is arranged adjacent to one lateral side of the square-cornered U-shaped bending track, and stores member materials to be used by the member assembly devices or intermediate materials for formation of the member materials so as to be capable of being supplied to the member assembly devices, the vulcanization zone is arranged adjacent to the other lateral side of the square-cornered U-shaped bending track, and the inspection and discharge zone is arranged adjacent to the other lateral side of the vulcanization zone.

Advantageous Effects of Invention

In the tire manufacturing system of the present invention, the green tire formation zone has the plurality of work stations arranged along the track. The member assembly device is disposed at each of the work stations. The tire constituent members are assembled to the outer surface of the rigid core moving on the track by the use of the member assembly devices, thereby to form the green tire. Each of the member assembly devices forms the tire constituent member by attaching the member material set for each of the tire constituent members to the rigid core, under the attachment condition determined according to size of the rigid core.

Therefore, there is no need to pre-form the tire constituent members as semi-finished members according to the tire size. As a result, the kinds of semi-finished members can be decreased in number to reduce the space for the material storage zone. In addition, there is no need for a process line for forming semi-finished members, and the member materials become less wide. This allows downsizing of the member assembly devices. Therefore, the space for the green tire formation zone can also be reduced.

In addition, the tire constituent members can be formed according to the size of the rigid core under the attachment conditions for the member materials. Thus, tires of plural sizes can be formed simultaneously on one line. This decreases the number of green tires to be vulcanized and allows simultaneous usage of vulcanization molds of plural sizes. Accordingly, it is possible to decrease the number of vulcanization molds not used at present.

Since the track is square-cornered U-shaped, the lateral length of the track can be reduced to ½ or less of a straight track. In addition, the vertical length of the track can be made narrower than that of a U-shaped bending track, for example. This minimizes the space occupied by the track.

The member assembly devices are arranged at the outer peripheral side of the square-cornered U-shaped bending track and along the lateral track parts. The material storage zone is arranged adjacent to one lateral side (vertical track part-side) of the square-cornered U-shaped bending track. Accordingly, material supply from the material storage zone to each of the member assembly devices can be performed by the shortest distance. In addition, the vulcanization zone is arranged adjacent to the other lateral side (opposite to the vertical track part) of the square-cornered U-shaped bending track. This makes it possible to carry the green tires from the green tire formation zone into the vulcanization zone by the shortest distance. That is, there is no waste of paths for conveying the materials and green tires.

In synergy among these advantages, a tire manufacturing plant can be significantly downsized into a space 25 m or less wide and 100 m or less long, for example.

BRIEF DESCRIPTION OF DRAWINGS

FIG. 7 is an illustrative diagram showing a method for forming a tread rubber (tire constituent member) from a rubber strip (member material);
FIGS. 9A to 9C are illustrative diagrams showing a method for forming a belt ply (tire constituent member) from a cord strip (member material);
FIGS. 21A and 21B are cross-sectional views showing a posture of the member material in contact with the rigid core.

DESCRIPTION OF EMBODIMENTS

Embodiment of the present invention will be described below in detail.

Figure 1:
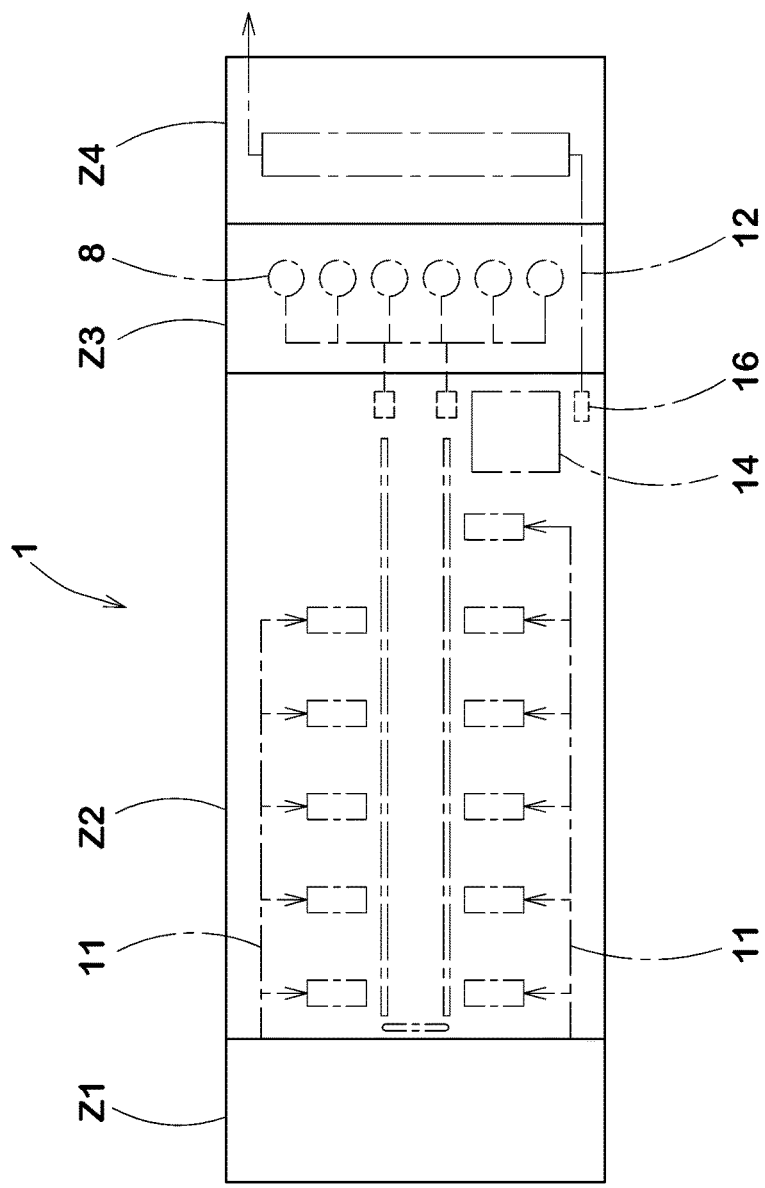
FIG. 1 is a conceptual plane view of one example of a tire manufacturing system according to the present invention.

As shown in FIG. 1, a tire manufacturing system 1 according to the embodiment includes a green tire formation zone Z2 for forming a green tire 6 (shown in FIG. 5), a vulcanization zone Z3 for vulcanizing the green tire 6, an inspection and discharge zone Z4 for inspecting and discharging the vulcanized tire, and a material storage zone Z1 for storing materials for green tires.

Figure 2:
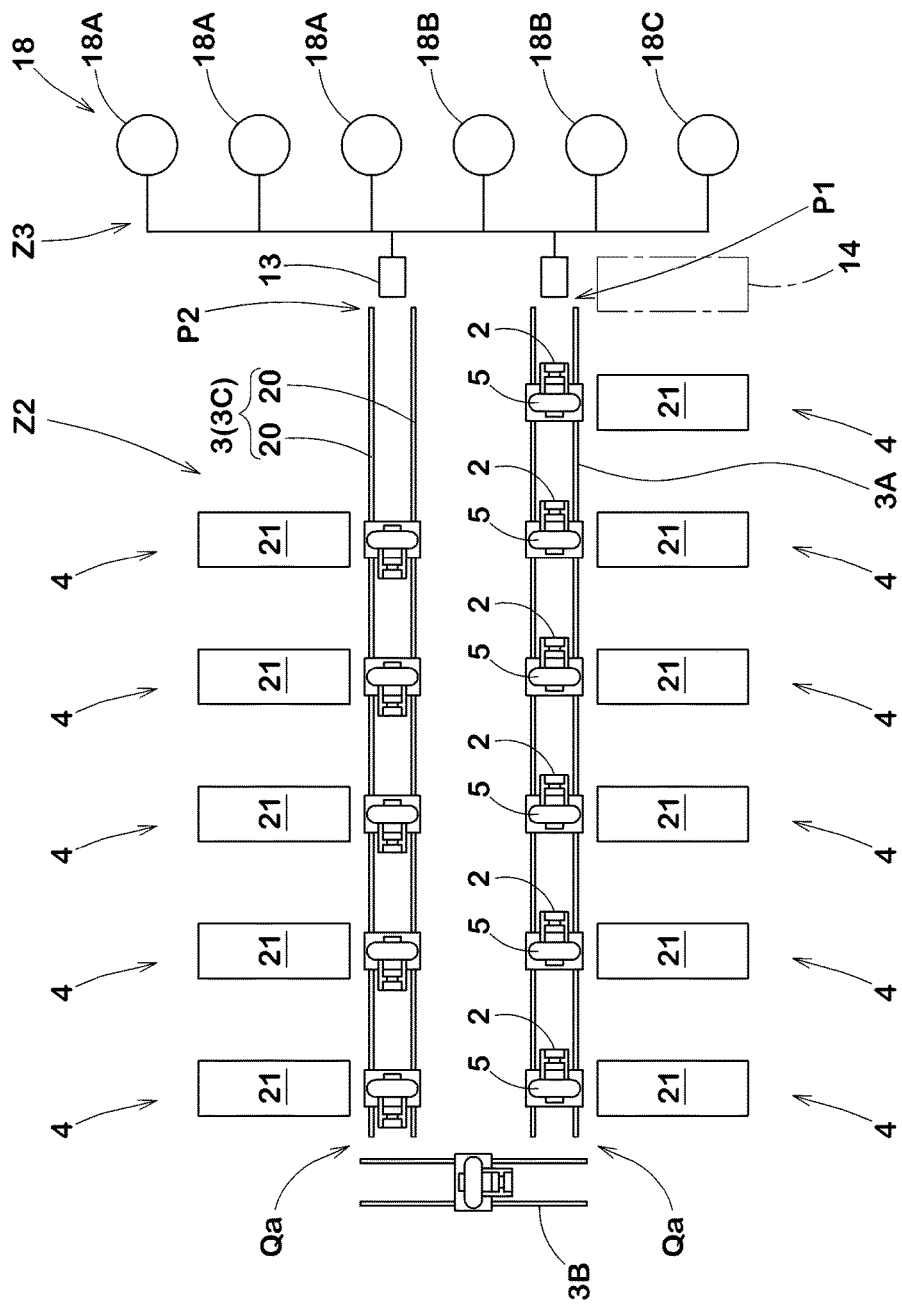
FIG. 2 is an enlarged conceptual plane view of a green tire formation zone and a vulcanization zone.

As shown in FIG. 2, among the foregoing zones, the green tire formation zone Z2 includes a green tire formation line having a track 3 and a plurality (n) of work stations 4 arranged along the track 3. On the green tire formation line, tire constituent members T are assembled to an outer surface of a rigid core 5 moving on the track 3 at each of the work stations 4 in the order of arrangement described above. Accordingly, the green tire 6 is formed from the plurality (n) of tire constituent members T.

Figure 5:
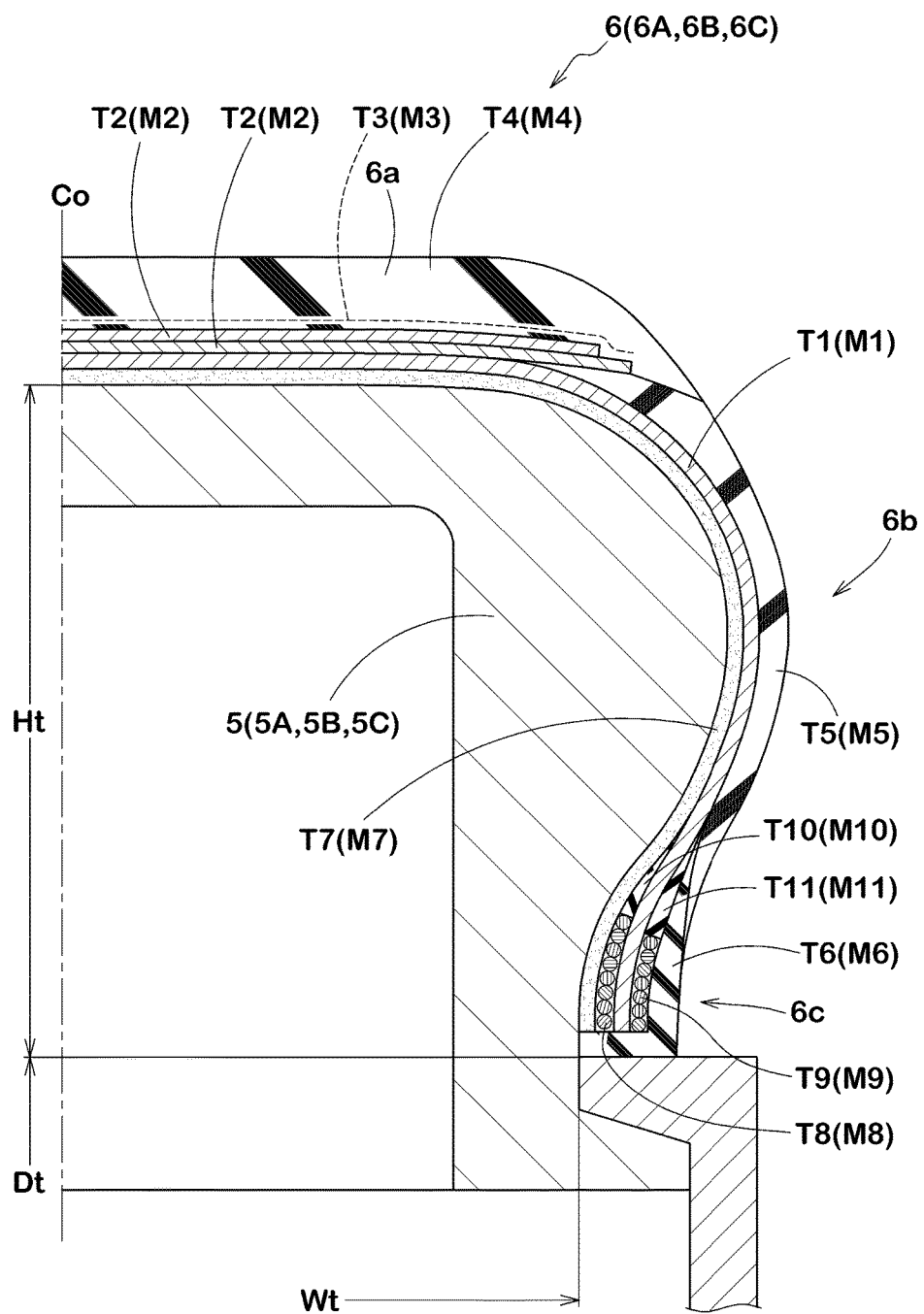
FIG. 5 is a cross-sectional view of one example of a green tire formed on the green tire formation line of the present invention.

FIG. 5 shows one example of the green tire 6 formed on the green tire formation line. In this example, the green tire 6 is composed of the plurality (n=11) of tire constituent members T as:

(A) one or more carcass plies T1 (one in this example) that is extended from a tread part 6a through a side wall part 6b to a bead part 6c;
(B) one or more belt plies T2 (two in this example) that are arranged at a radial outside of the carcass ply T1 and at an inside of the tread part 6a;
(C) one or more band plies T3 (one in this example) that is arranged on a further radial outside of the belt plies T2;
(D) a tread rubber T4 that constitutes an outer surface of the tread part 6a;

(E) a side wall rubber T5 that constitutes an outer surface of the side wall part 6b;

(F) a chafer rubber T6 for prevention of rim shift that constitutes an outer surface of the bead part 6c;

(G) an inner liner rubber T7 that constitutes a tire luminal surface;

(H) inner and outer bead cores T8 and T9 that are arranged at the bead part 6c to sandwich a radially inner end portion of the carcass ply T1 from tire axial inside and outside; and (I) inner and outer bead apex rubbers T10 and T11 for reinforcement of beads erected from the inner and outer bead cores T8 and T9, respectively.

The carcass ply T1 has carcass cords arranged at an angle of 90° relative to a tire equator Co, for example, and a topping rubber covering the carcass cords. The belt plies T2 each has belt cords arranged at an angle $\theta$ of 10 to 40° relative to the tire equator Co (as shown in FIG. 9) and a topping rubber covering the belt cords. The band ply T3 has band cords arranged in a tire circumferential direction and a topping rubber covering the band cords.

The plurality (n=11) of tire constituent members T1 to T11 constituting the green tire 6 are formed by attaching member materials M1 to M11 under attachment conditions J. The attachment conditions J are determined according to the size of the rigid core 5.

For example, when the green tires 6 of three sizes A, B, and C are to be formed, (a) the green tire 6A of the size A is formed by attaching the following members to the outer peripheral surface of a rigid core 5A:

a tire constituent member T1A formed by attaching a member material M1 under an attachment condition J1A;

a tire constituent member T2A formed by attaching a member material M2 under an attachment condition J2A;

a tire constituent member T3A formed by attaching a member material M3 under an attachment condition J3A;

a tire constituent member T4A formed by attaching a member material M4 under an attachment condition J4A;

a tire constituent member T5A formed by attaching a member material M5 under an attachment condition J5A;

a tire constituent member T6A formed by attaching a member material M6 under an attachment condition J6A;

a tire constituent member T7A formed by attaching a member material M7 under an attachment condition J7A;

a tire constituent member T8A formed by attaching a member material M8 under an attachment condition J8A;

a tire constituent member T9A formed by attaching a member material M9 under an attachment condition J9A;

a tire constituent member T10A formed by attaching a member material M10 under an attachment condition J10A; and a tire constituent member T11A formed by attaching a member material M11 under an attachment condition J11A.

The green tire 6B of the size B is formed by attaching the following members to the outer peripheral surface of a rigid core 5B:

a tire constituent member T1B formed by attaching the member material M1 under an attachment condition J1B;

a tire constituent member T2B formed by attaching the member material M2 under an attachment condition J2B;

a tire constituent member T3B formed by attaching the member material M3 under an attachment condition J3B;

a tire constituent member T4B formed by attaching the member material M4 under an attachment condition J4B;

a tire constituent member T5B formed by attaching the member material M5 under an attachment condition J5B;

a tire constituent member T6B formed by attaching the member material M6 under an attachment condition J6B;

a tire constituent member T7B formed by attaching the member material M7 under an attachment condition J7B;

a tire constituent member T8B formed by attaching the member material M8 under an attachment condition J8B;

a tire constituent member T9B formed by attaching the member material M9 under an attachment condition J9B;

a tire constituent member T10B formed by attaching the member material M10 under an attachment condition J10B; and a tire constituent member T11B formed by attaching the member material M11 under an attachment condition J11B.

The green tire 6C of the size C is formed by attaching the following members to the outer peripheral surface of a rigid core 5C:

a tire constituent member T1C formed by attaching the member material M1 under an attachment condition J1C;

a tire constituent member T2C formed by attaching the member material M2 under an attachment condition J2C;

a tire constituent member T3C formed by attaching the member material M3 under an attachment condition J3C;

a tire constituent member T4C formed by attaching the member material M4 under an attachment condition J4C;

a tire constituent member T5C formed by attaching the member material M5 under an attachment condition J5C;

a tire constituent member T6C formed by attaching the member material M6 under an attachment condition J6C;

a tire constituent member T7C formed by attaching the member material M7 under an attachment condition J7C;

a tire constituent member T8C formed by attaching the member material M8 under an attachment condition J8C;

a tire constituent member T9C formed by attaching the member material M9 under an attachment condition J9C;

a tire constituent member T10C formed by attaching the member material M10 under an attachment condition J10C; and a tire constituent member T11C formed by attaching the member material M11 under an attachment condition J11C.

Specifically, the tire constituent members T1 to T11 are divided into rubber members TG, cord ply members TC, and wire members TW. In this example, the rubber members TG include the tread rubber T4, the side wall rubber T5, the chafer rubber T6, the inner liner rubber T7, and inner and outer bead apex rubbers T10 and T11. The cord ply members TC include the carcass ply T1, the belt plies T2, and the band ply T3. The wire members TW include the inner and outer bead cores T8 and T9.

Figure 6A:
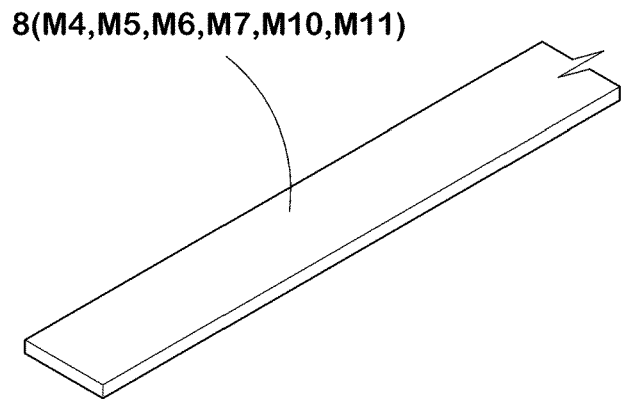
FIGS. 6A to 6C are perspective views of member materials for forming tire constituent members.

Elongated tape-like rubber strip 8 is used for each of the member material M4 for the tread rubber T4, the member material M5 for the side wall rubber T5, the member material M6 for the chafer rubber T6, the member material M7 for the inner liner rubber T7, and the member materials M10 and M11 for the inner and outer bead apex rubbers T10 and T11, which constitute the rubber member TG, as shown in FIG. 6A. The so-called strip winding method (STW method) by which to wind a strip in a spiral is applied to the rubber strip 8 as shown in FIG. 7. By changing such conditions as the spiral pitch for winding and the number of windings, for example, the rubber member TG can be formed as appropriate in a desired cross-section shape and cross-section size. Similarly, by adjusting the foregoing conditions, the size of the rubber member TG can be adapted to the size of the rigid core 5. Therefore, the attachment conditions J4, J5, J6, J7, J10, and J11 for the member materials M4, M5, M6, M7, M10, and M11 may include the spiral pitch, the number of windings, and the like. As a matter of course, the rubber composition and cross-section dimensions of the rubber strip 8 can be set for each of the member materials M4, M5, M6, M7, M10, and M11.

Figure 6B:
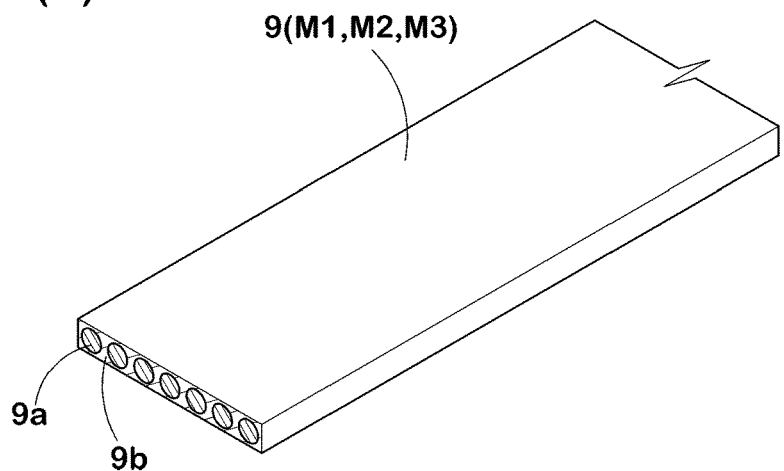

Elongated tape-like cord strip 9 formed by covering an arrangement of tire cords 9a aligned in the longitudinal direction with a topping rubber 9b is used for each of the member material M1 for the carcass ply T1, the member material M2 for the belt plies T2, and the member material M3 for the band ply T3, which constitute the cord ply member TC, as shown in FIG. 6B.

The carcass ply T1 is formed, as shown in FIGS. 8A to 8D, such that short strip pieces 9A obtained by cutting the cord strip 9 in a predetermined length are sequentially attached in the tire circumferential direction with the tire cords 9a perpendicular to the tire equator Co. At that time, by adjusting cut length L of the short strip pieces 9A, overlapping width Wg (or a gap) between the short strip pieces 9A, the number of circumferentially attached short strip pieces 9A, or the like, the size of the carcass ply T1 can be adapted to the size of the rigid core 5. Therefore, the attachment condition J1 for the member material M1 may include the cut length L of the short strip pieces 9A, the overlapping width Wg (or a gap) between the short strip pieces 9A, the number of the circumferentially attached short strip pieces 9A, or the like.

The belt plies T2 are formed, as shown in FIGS. 9A to 9C, such that short strip pieces 9B obtained by cutting obliquely the cord strip 9 in a predetermined length are sequentially attached in the tire circumferential direction with the tire cords 9a inclined at the angle θ relative to the tire equator Co. At that time, by adjusting cutting angle α and cutting length L of the short strip pieces 9B, gap Wd between the short strip pieces 9B, the number of circumferentially attached short strip pieces 9B, attachment angle θ (θ=α), or the like, the size of the belt plies T2 can be adapted to the size of the rigid core 5. Therefore, the attachment condition J2 for the member material M2 may include the cutting angle α and the cutting length L of the short strip pieces 9B, the gap Wd between the short strip pieces 9B, the number of circumferentially attached short strip pieces 9B, the attachment angle θ (θ=α), or the like.

The band ply T3 is formed by winding continuously the cord strip 9 in a spiral in the tire circumferential direction. At that time, by adjusting the spiral pitch, the number of windings of the cord strip 9, or the like, the size of the band ply T3 can be adapted to the size of the rigid core 5. Therefore, the attachment condition J3 for the member material M3 may include the spiral pitch, the number of windings of the cord strip 9, or the like. As a matter of course, the material, thickness, inter-cord distance of the tire cords 9a, rubber composition of the topping rubber 9b, and the like in the cord strip 9 are set for each of the member materials M1, M2, and M3.

Figure 6C:
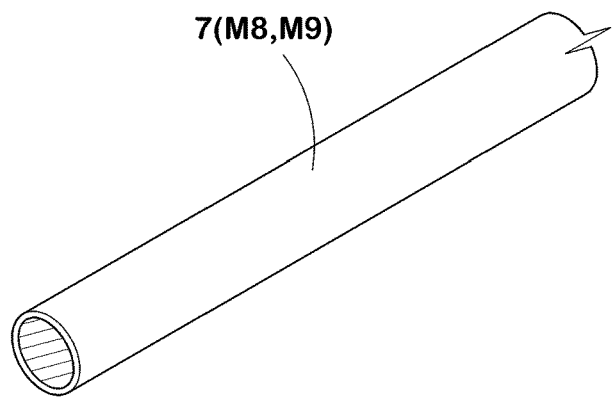
Figure 8A:
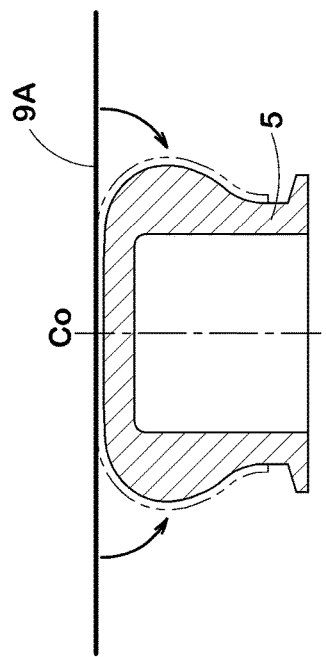
FIGS. 8A to 8D are illustrative diagrams showing a method for forming a carcass ply (tire constituent member) from a cord strip (member material)
Figure 8B:
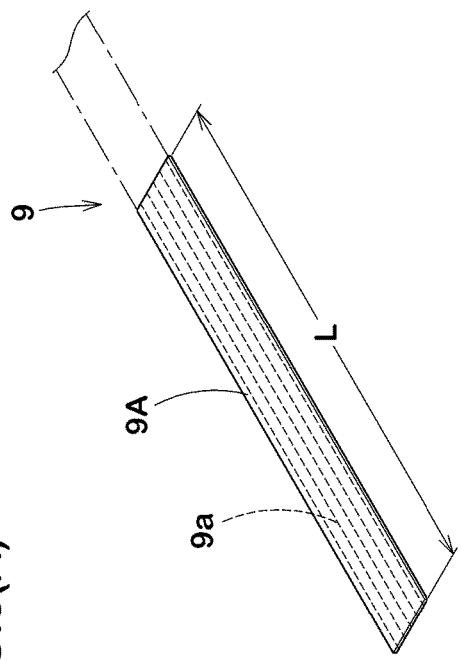
Figure 8C:
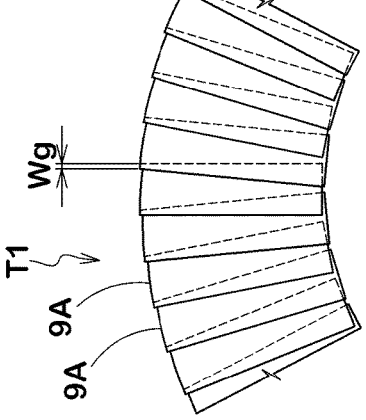
Figure 8D:
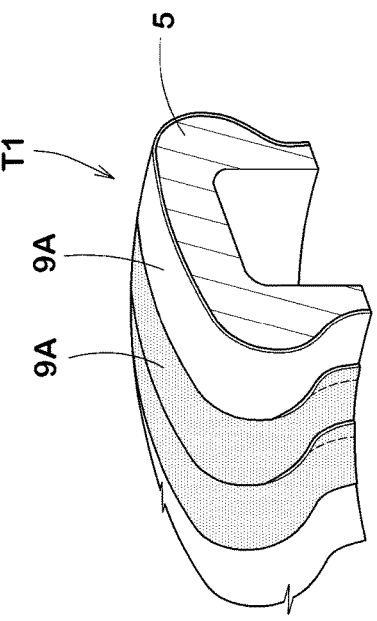

Rubberized wire 7 shown in FIG. 6C is used for each of the member materials M8 and M9 for the inner and outer bead cores T8 and T9 constituting the wire member TW. The bead cores T8 and T9 are formed by winding involutedly the rubberized wire 7 from a radial inside to outside. By adjusting the winding radius, the number of windings, or the like of the rubberized wire 7, the sizes of the bead cores T8 and T9 can be adapted to the size of the rigid core 5. Therefore, the attachment conditions J8 and J9 for the member materials M8 and M9 may include the winding radius, the number of windings, or the like of the rubberized wire 7.

Next, the rigid core 5 includes rigid cores of plural sizes to form tires of different sizes. In this example, rigid cores 5A, 5B, and 5C of three sizes are used, for instance, to form green tires 6A, 6B, and 6C of three sizes simultaneously on one line. The rigid cores 5A, 5B, and 5C are different in at least one of bead diameter Dt, bead width Wt, cross-section height Ht, and the like, as shown in FIG. 5.

Figure 15:
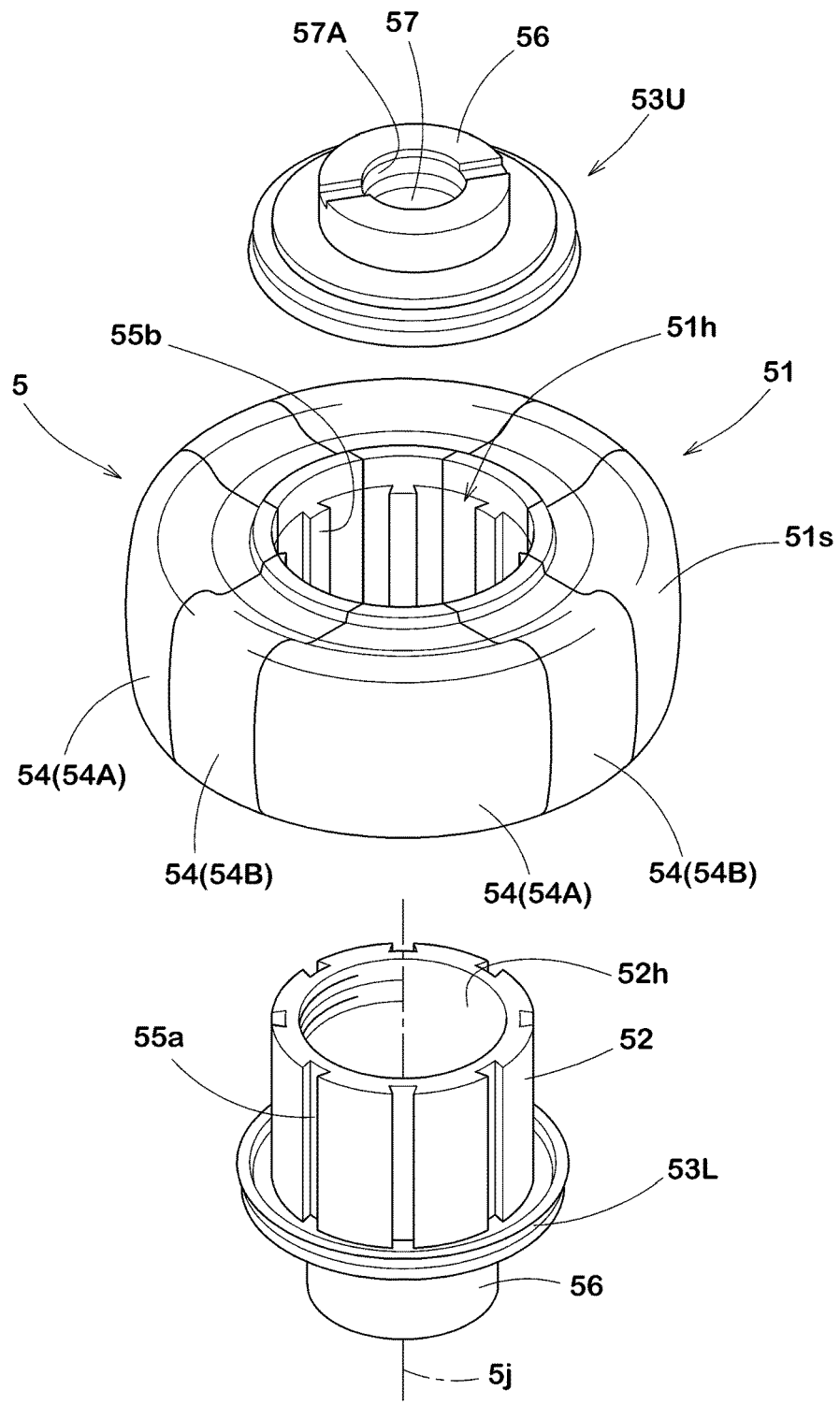
FIG. 15 is an exploded perspective view of a rigid core.

FIG. 15 shows one example of the rigid core 5. The rigid core 5 in this example includes a toroidal core main body 51 and support shaft parts 56 that are attached to the core main body 51 and protruded to both outer sides of a core shaft center 5j concentrically with the core shaft center 5j.

Specifically, the rigid core 5 of this example includes the core main body 51, a cylindrical core 52 that is inserted into a central hole 51h of the core main body 51, and a pair of side wall bodies 53L and 53U that are arranged on both sides of the shaft center direction of the core main body 51. An outer surface 51s of the core main body 51 has an outer shape almost equal to a luminal surface of a vulcanized tire. The green tire 6 is formed on the outer surface 51s. The core main body 51 is composed of a plurality of segments 54 divided in the tire circumferential direction. The segments 54 include first and second segments 54A and 54B alternately arranged in the tire circumferential direction. Both circumferential end surfaces of the first segment 54A are inclined in the direction in which the circumferential width of the same gradually decreases toward the radially inner side. Both circumferential end surfaces of the second segment 54B are inclined in the direction in which the circumferential width of the same gradually increases toward the radially inner side.

Formed on an outer peripheral surface of the core 52 and an inner peripheral surface of the segment 54 are dovetail grooves 55a or dovetail tenons 55b that are extended in the direction of the core shaft center and engaged with each other. Accordingly, the core 52 and the segments 54 are coupled together so as to be capable of relative movement only in the direction of the core shaft center. The side wall body 53L is fixed to one end portion of the core 52 in the direction of the shaft center, and the side wall body 53U is detachably attached to the other end portion of the same. In this example, the side wall body 53U is screwed into the central hole 52h of the core 52.

The support shaft parts 56 are protruded from the side wall bodies 53L and 53U. Each of the support shaft parts 56 has a coupling hole portion 57 concentrically recessed at an outer end portion thereof. A circumferential groove 57A is formed on an inner peripheral surface of the coupling hole portion 57. The support shaft parts 56 are detachably coupled to coupling parts 42B (shown in FIGS. 17 and 18) provided in a core carrying cart 2.

As shown in FIG. 2, the track 3 is formed as a horizontally-long, square-cornered U-shaped bending track. Specifically, the track 3 is composed of a pair of lateral track parts 3A, 3C extended in the lateral direction and parallel to each other and a vertical track part 3B connecting end portions of the lateral track parts 3A, 3C at one lateral side. When the end portion of the lateral track part 3A at the other lateral side is set as a starting end position P1, the rigid core 5 is guided through the lateral track part 3A, the vertical track part 3B, and the lateral track part 3C, to the end portion of the lateral track part 3C at the other lateral side as a terminating end position P2. Bending sections Qa are formed at the intersection of the lateral track part 3A and the vertical track part 3B and at the intersection of the vertical track part 3B and the lateral track part 3C. In this example, the track 3 is formed by a pair of rails 20 parallel to each other.

Arranged in the plurality (n=11) of work stations 4 along the track 3 are member assembly devices 21 for assembling the tire constituent members T to the outer surface of the rigid core 5. The member assembly devices 21 are controlled by a control device 10 (shown in FIG. 4) to attach the member materials M under the attachment conditions J specified by the control device 10.

The rigid core 5 is carried on the core carrying cart 2 moving on the track 3. In this example, the core carrying cart 2 is disposed in each of the work stations 4. The core carrying cart 2 moves in the work station 4 to which the core carrying cart 2 belongs. Each of the core carrying carts 2 sequentially delivers the rigid core 5 to the core carrying cart 2 belonging to the adjacent work station 4. This delivery makes it possible to convey the rigid core 5 from the starting end position P1 to the terminating end position P2 in the track 3 as a square-cornered U-shaped bending track with the bending sections Qa. In other words, this delivery makes it possible to employ a square-cornered U-shaped bending track to reduce the lateral track length to ½ or less of the length of a straight track. It is also possible to make the vertical length of the track smaller than that of a U-shaped bending track, for example, to minimize the space occupied by the track 3 (including the inner space surrounded by the track 3).

Figure 16:
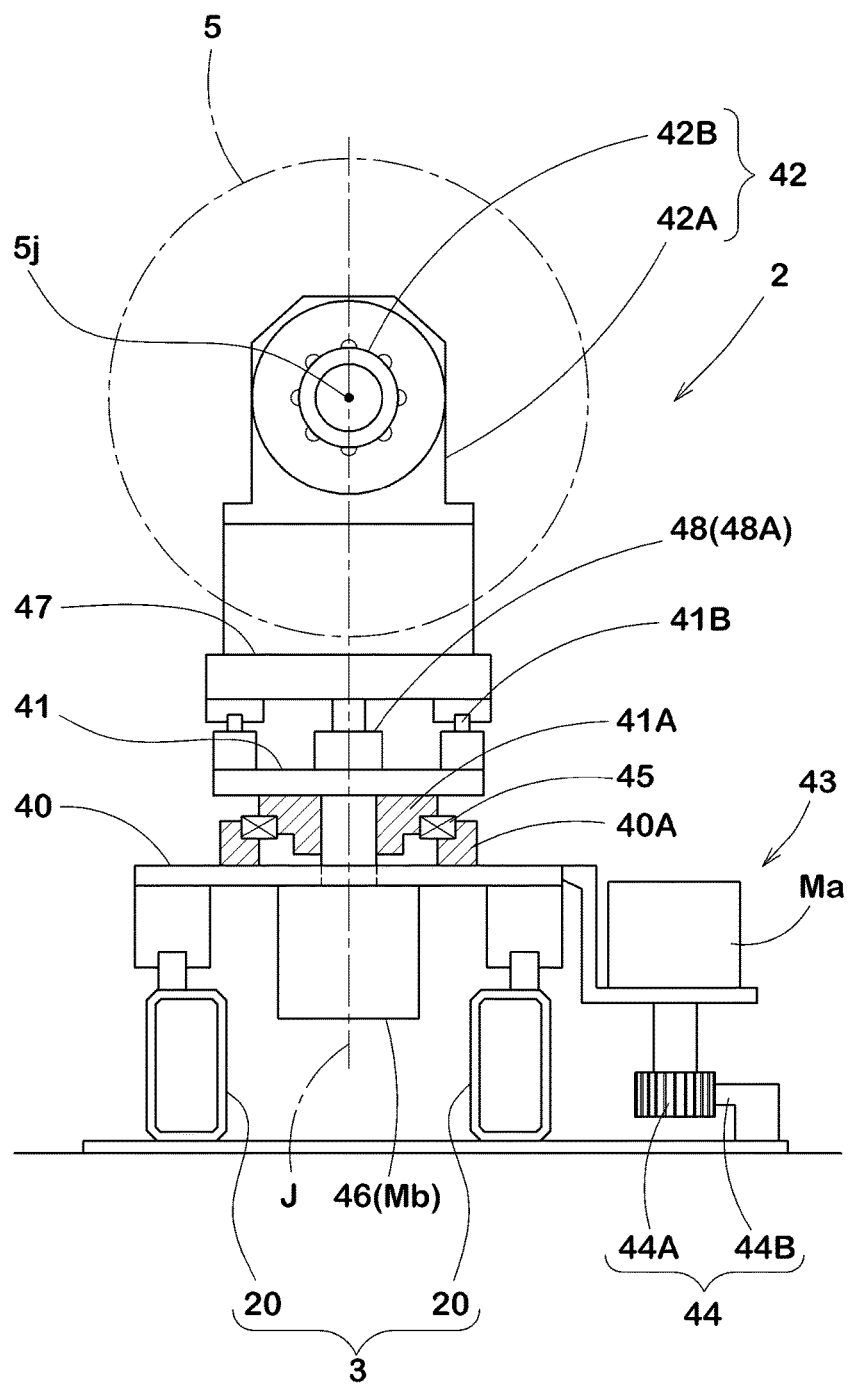
FIG. 16 is a front view of a core carrying cart.
Figure 17:
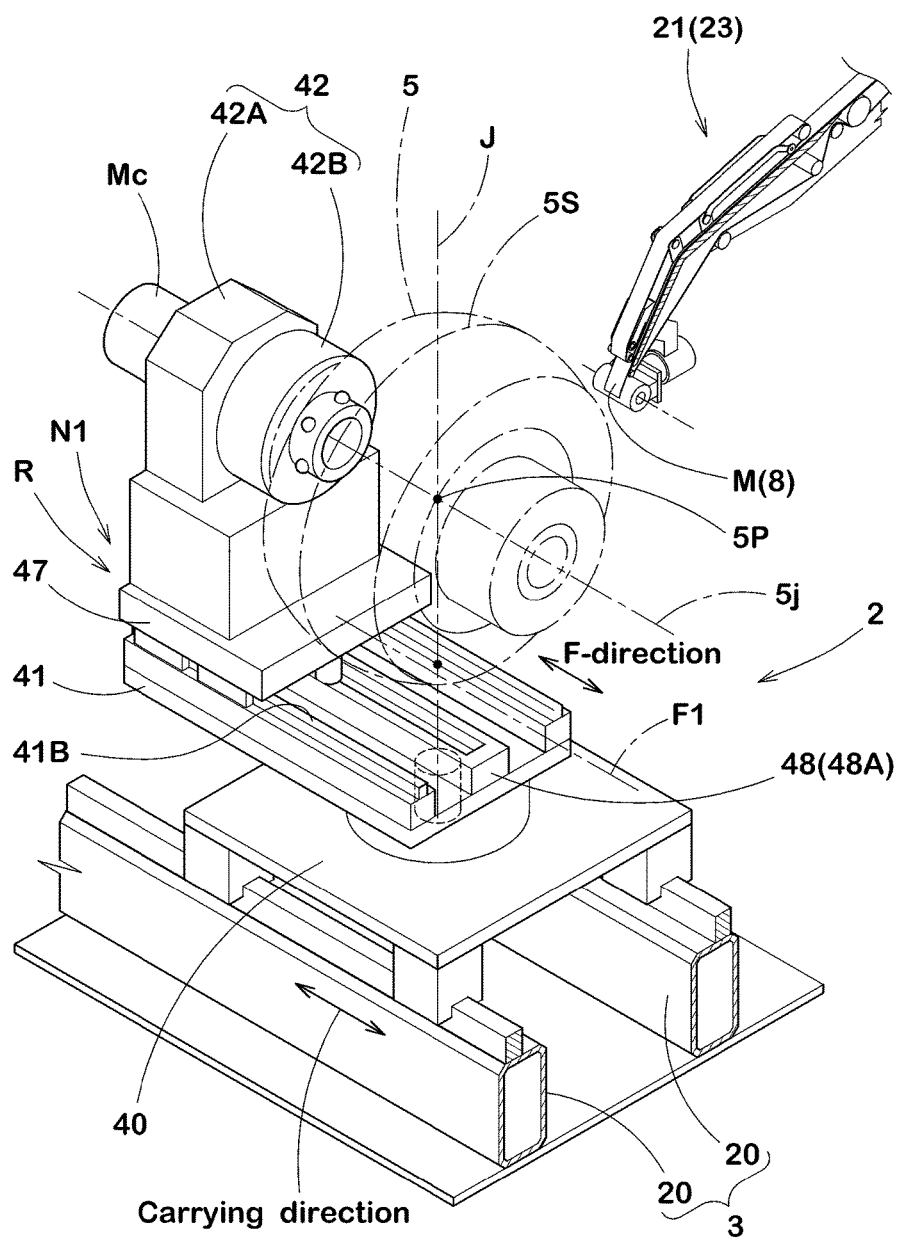
FIG. 17 is a perspective view of the core carrying cart.
Figure 18:
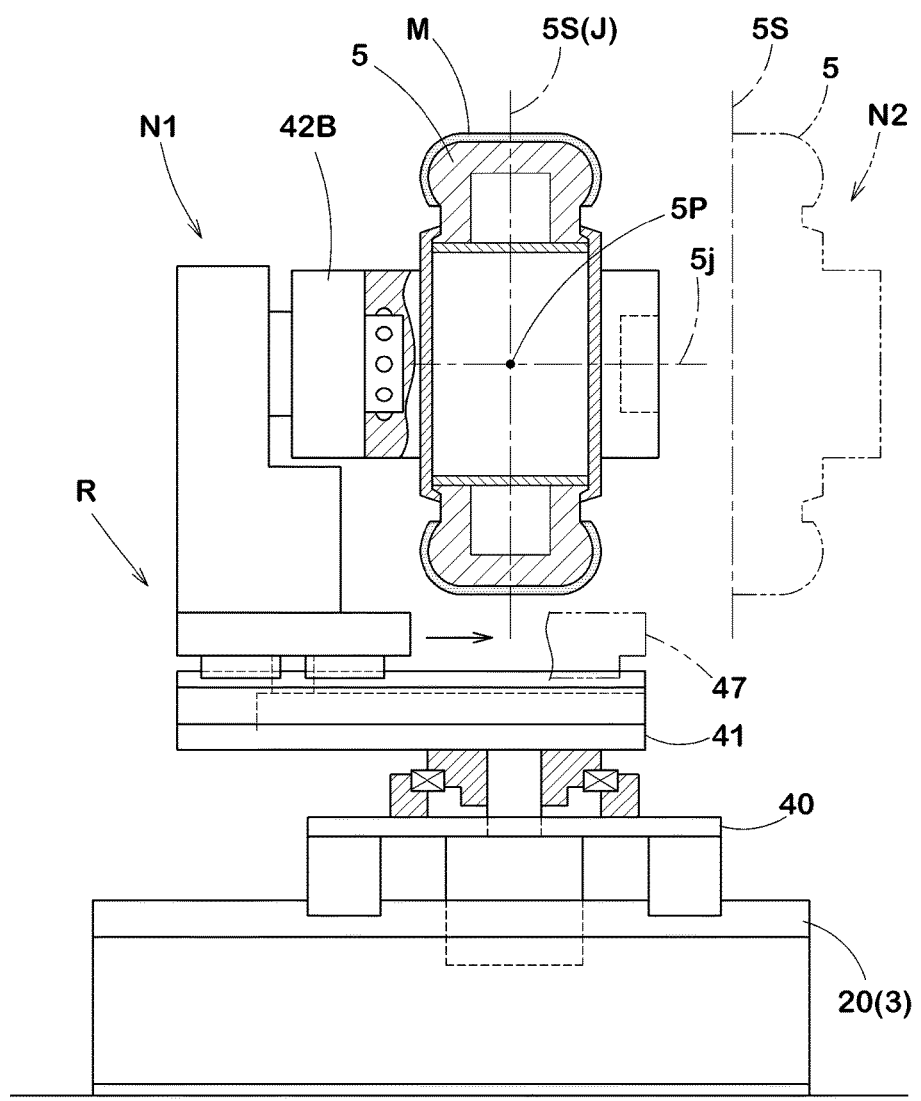
FIG. 18 is a side view of the core carrying cart.

The core carrying cart 2 in this example holds the rigid core 5 so as to be capable of rotation around the horizontal core shaft center 5*j*, as shown in FIGS. 16 to 18. Specifically, the core carrying cart 2 includes a carrying stage 40 that can move on the track 3 in the carrying direction, a to stage 41 that is supported by the carrying stage 40 and can turn around a vertical turning shaft center J, and a core support stage 42 that is supported by the turning stage 41.

The carrying stage 40 can move on the track 3 in the carrying direction, guided by the rails 20. Driving means 43 for the carrying stage 40 in this example include a servo motor Ma attached to the carrying stage 40 and a gear rack mechanism 44. The gear rack mechanism 44 has a gear 44A that is rotated and controlled by the servo motor Ma and a rack 44B that is laid along the rails 20 and engaged with the gear 44A. Instead of the gear rack mechanism 44, a known ball screw mechanism or the like can be preferably employed, for example.

In this example, a ring-shaped guide part 40A is arranged on an upper surface of the carrying stage 40. A boss part 41A is protruded from a lower surface of the turning stage 41 and pivotally supported by the guide part 40A via a bearing 45. Accordingly, the turning stage 41 is turnably supported around the vertical turning shaft center J concentric to the guide part 40A. As a driving means 46 for the turning stage 41, a servo motor Mb is attached to the carrying stage 40 and its output shaft is coupled to the boss part 41A.

In this example, the core supporting stage 42 is supported by the turning stage 41 via a horizontal moving stage 47. The horizontal moving stage 47 can move horizontally on a horizontal F-direction line F1 (shown in FIG. 17) passing through the turning shaft center J from a first position N1 to a second position N2 (shown in FIG. 19), guided by guide rails 41B laid on an upper surface of the turning stage 41. As a driving means 48 for the horizontal moving stage 47 in this example, a rod-less cylinder 48A is attached to the turning stage 41, for instance. The cylinder 48A allows the horizontal moving stage 47 to switch between the first position N1 and the second position N2.

The core supporting stage 42 includes a supporting stage main body 42A erected from the horizontal moving stage 47 and a coupling part 42B provided at the supporting stage main body 42A. The coupling part 42B is detachably coupled to one supporting shaft part 56 of the rigid core 5.

Figure 20:
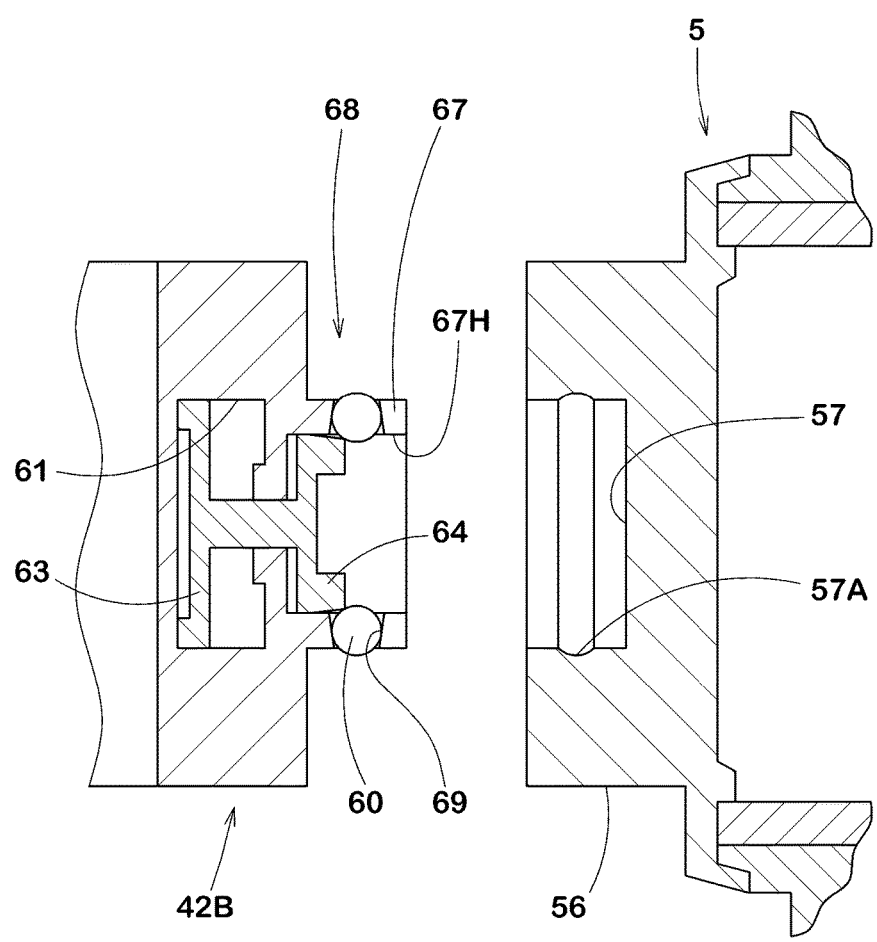
FIG. 20 is a cross-sectional view of a coupling structure between a support shaft part and a coupling part.

The coupling part 42B is rotated and driven around the horizontal core shaft center 5*j* by a driving motor Mc attached to the supporting stage main body 42A. The coupling part 42B includes a coupling tube portion 67 that is inserted into the coupling hole portion 57 in the supporting shaft part 56 of the rigid core 5 and a ball lock mechanism 68 that locks between the coupling hole portion 57 and the coupling tube portion 67 as shown in FIG. 20.

The ball lock mechanism 68 includes rigid balls 60, a piston piece 63, and a plunger 64. The rigid balls 60 are held in a plurality of through holes 69 formed in a peripheral wall of the coupling tube portion 67. The through holes 69 are circumferentially distributed and configured to penetrate through the peripheral wall in radially inward and outward directions. The piston piece 63 is stored in a cylinder chamber 61 within the coupling part 42B. In addition, the piston piece 63 moves in the cylinder chamber 61 inward and outward in the shaft center direction, through supply and discharge of compressed air to and from the cylinder chamber 61. The plunger 64 is arranged in a central hole 67H of the coupling tube portion 67 and coupled to the piston piece 63 so as to be capable of integral movement.

The plunger 64 pushes the rigid balls 60 outward in the radial direction by outward movement of the piston piece 63 in the shaft center direction. Accordingly, the rigid balls 60 are pressed against the peripheral groove 57A to lock the supporting shaft part 56 and the coupling part 42B. The plunger 64 also stops pushing of the rigid balls 60 by inward movement of the piston piece 63 in the shaft center direction. Accordingly, the coupling part 42B is decoupled and removed from the supporting shaft part 56.

In this example, the first position N1 refers to a position for assembling the tire constituent member T to the rigid core 5, and the second position N2 refers to a position for delivering the rigid core 5 to the adjacent core carrying cart 2.

At the first position N1, as shown in FIG. 17, the turning shaft center J passes through a core central point 5P at which an equator surface 5S of the rigid core 5 held by the coupling part 42B intersects with the core shaft center 5*j*. When the tire constituent member T is attached to the outer surface of the rigid core 5, it is necessary to keep the outer peripheral surface of the rigid core 5 and the member material M in a posture of contact with each other at widthwise center Mo of the member material M, as exemplified in FIG. 21, to suppress wrinkles and deformation and increase the accuracy of attachment. At that time, when the rigid core 5 is turned around a vertical shaft center passing through the core central point 5P, the rigid core 5 can be kept in the foregoing posture of contact without having to change the posture of the member material M. Specifically, when the member material M is to be attached to the rigid core 5 at the first position N1 where the turning shaft center J of the turning stage 41 passes through the core central point 5P, the turning of the turning stage 41 makes it easy to attach the member material M even to the complicated outer peripheral surface of the rigid core 5 while keeping the posture of contact.

Figure 19:
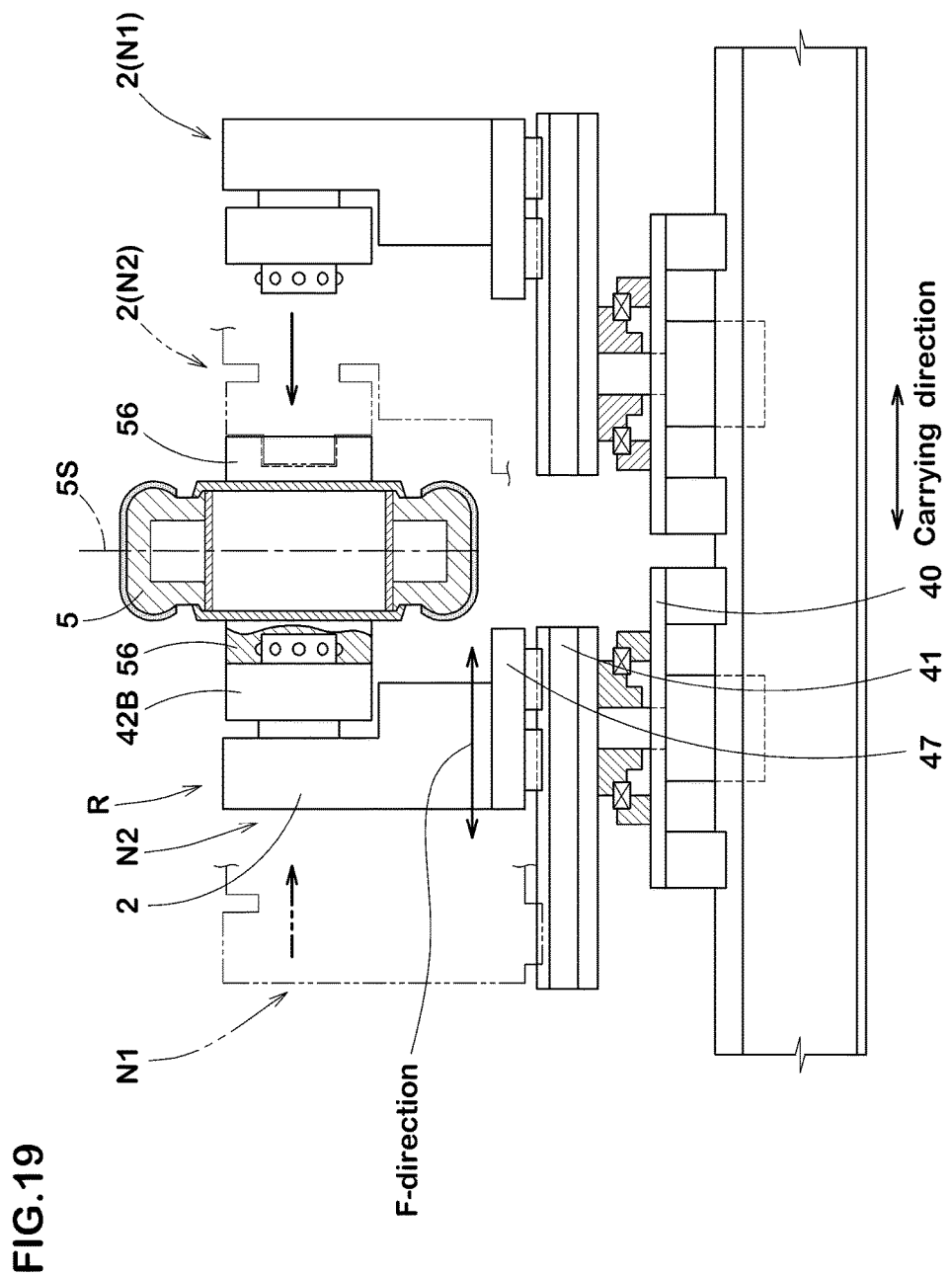
FIG. 19 is a side view showing delivery of a rigid core between core carrying carts.

Meanwhile, at the second position N2, as shown in FIG. 19, the equator surface 5S of the rigid core 5 held by the coupling part 42B is positioned at the outer side in the carrying direction than the carrying stage 40, the turning stage 41, and the horizontal moving stage 47, in a turning reference state R in which the F-direction line F1 is parallel to the carrying direction. Therefore, when the horizontal moving stage 47 is situated at the second position N2 and two core carrying carts 2, 2 come close to each other with the turning stages 41 in the turning reference state R, it is possible to deliver the rigid core 5 on the core carrying cart 2 to the other adjacent core carrying cart 2 without causing collision between the carrying carts 40, collision between the turning stages 41, or collision between the horizontal moving stages 47. At the vertical track part 3B, carrying carts of a different structure only for delivery of the rigid core 5 can be used.

Figure 3:
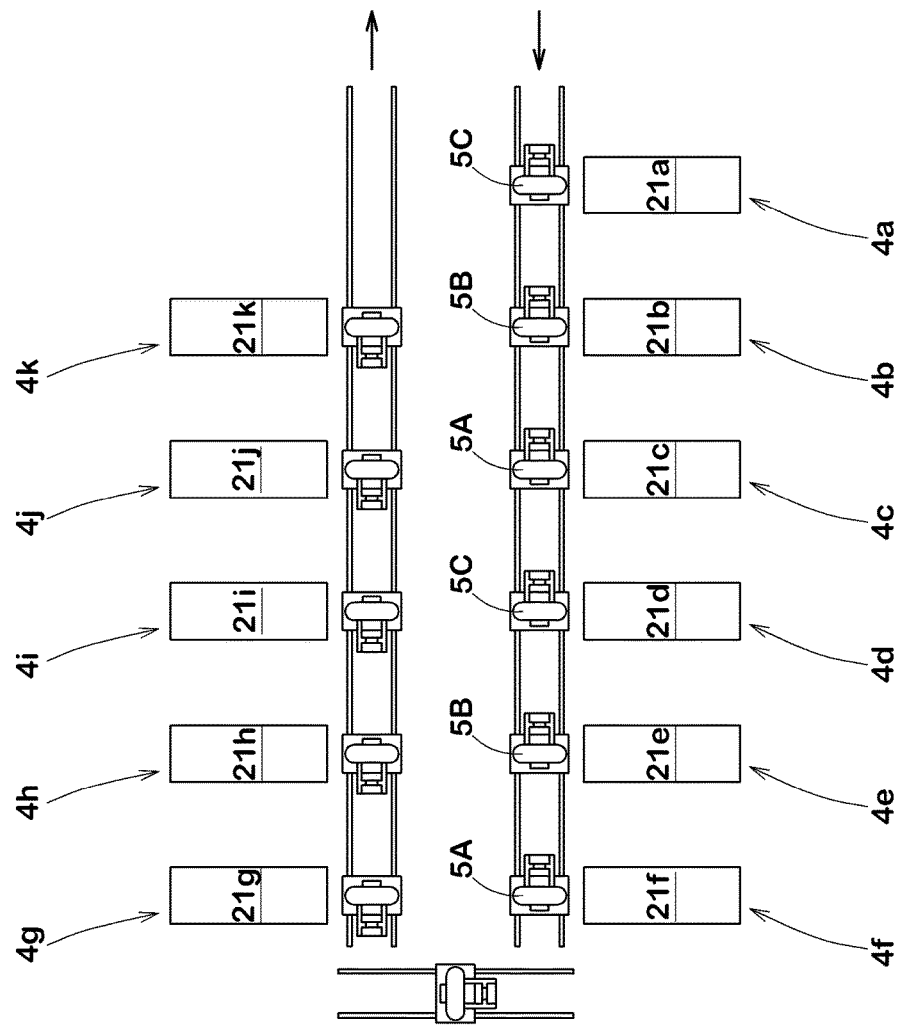
FIG. 3 is an enlarged conceptual plane view of the green tire formation line.

In this example, as shown in the enlarged view of FIG. 3, the work station 4 is composed of:

(1) a first work station 4a that includes a member assembly device 21a for assembling the chafer rubber T6 as member assembly device 21;

(2) a second work station 4b that includes a member assembly device 21b for assembling the inner liner rubber T7 as member assembly device 21;

(3) a third work station 4c that includes a member assembly device 21c for assembling the inner bead core T8 as member assembly device 21;

(4) a fourth work station 4d that includes a member assembly device 21d for assembling the inner bead apex rubber T10 as member assembly device 21;

(5) a fifth work station 4e that includes a member assembly device 21e for assembling the carcass ply T1 as member assembly device 21;

(6) a sixth work station 4f that includes a member assembly device 21f for assembling the outer bead core T9 as member assembly device 21;

(7) a seventh work station 4g that includes a member assembly device 21g for assembling the outer bead apex rubber T11 as member assembly device 21;

(8) an eighth work station 4h that includes a member assembly device 21h for assembling the belt ply T2 as member assembly device 21;

(9) a ninth work station 4i that includes a member assembly device 21i for assembling the band ply T3 as member assembly device 21;

(10) a tenth work station 4j that includes a member assembly device 21j for assembling the side wall rubber T5 as member assembly device 21; and

(11) an eleventh work station 4k that includes a member assembly device 21k for assembling the tread rubber T4 as member assembly device 21. These stations are arranged in this order along the track 3.

The member assembly devices 21 are arranged on the outer peripheral side of the square-cornered U-shaped bending track and along the lateral track parts 3A, 3C. If the member assembly devices 21 are arranged on the inner peripheral side of the square-cornered U-shaped bending track, it is difficult to supply materials from the material storage zone Z1 to the member assembly devices 21. If the member assembly devices 21 are arranged along the vertical track part 3B, the lateral length of the green tire formation zone Z2 increases unnecessarily, and this is not advantageous for downsizing of the manufacturing plant.

Figure 4A:
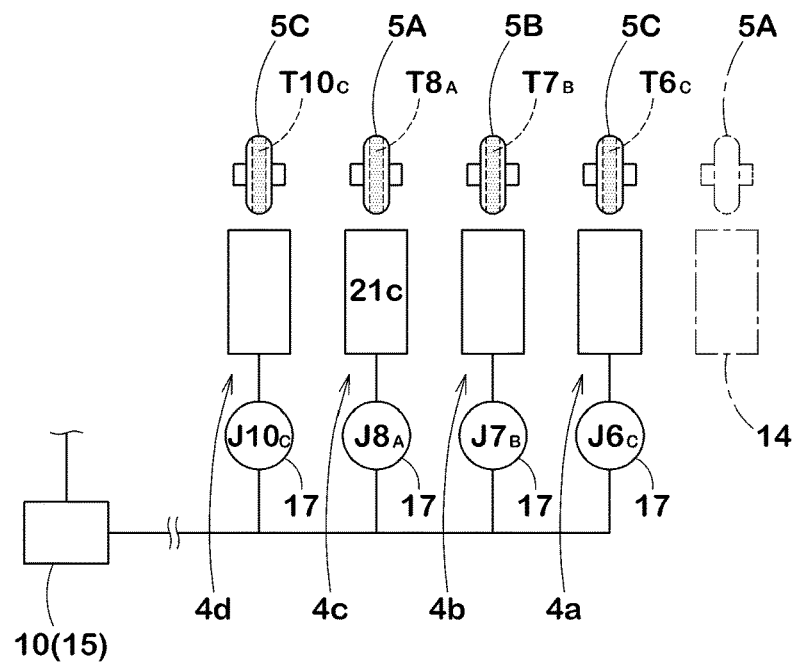
FIGS. 4A and 4B are operational diagrams describing control operations by a control device.
Figure 4B:
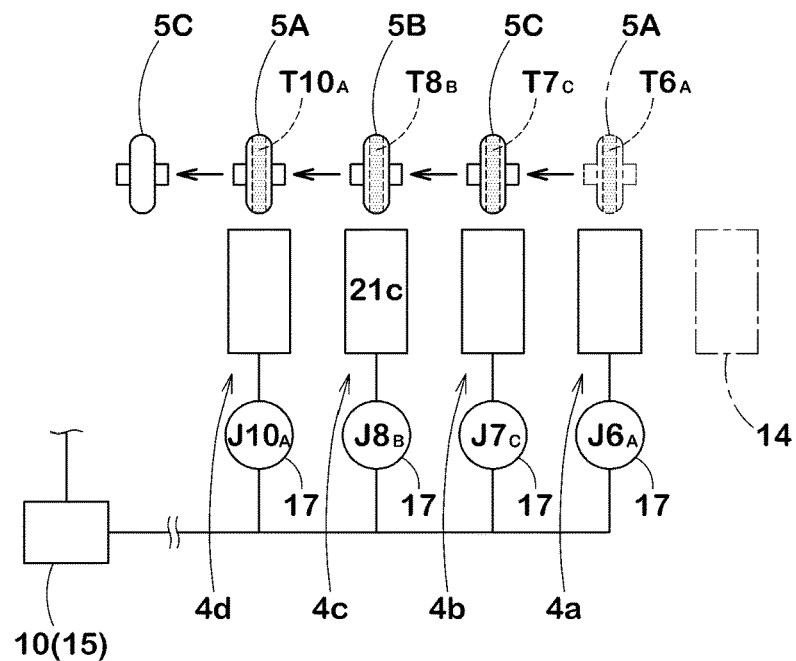

The control device 10 controlling the member assembly devices 21a to 21k includes a storage part 15, an identification sensor (not shown), and a control unit 17, as shown in FIGS. 4A and 4B.

The storage part 15 stores in advance data on the attachment conditions J for the member materials M determined according to the size of the rigid core 5. In this example, the storage part 15 stores data on the attachment conditions J1A to J11A for the member material s M1 to M11 of size A, data on the attachment conditions J1B to J11B for the member materials M1 to M11 of size B, and attachment conditions J1C to J11C for the member materials M1 to M11 of size C.

Each time the rigid core 5 is carried into the work station 4, the identification sensor identifies the size of the carried rigid core 5. In this example, the identification sensors are arranged at the work stations 4a to 4k to identify the size of the rigid core 5 carried into the first work station 4a, the size of the rigid core 5 carried into the second work station 4b, . . . and the size of the rigid core 5 carried into the eleventh work station 4k, at each time of carrying. There is no particular limitation on the method of identification. For example, identification marks, IC tags, or the like are provided to the rigid cores 5 so that the identification sensors can read the marks or tags to identify the sizes of the rigid cores 5.

The control unit 17 controls the member assembly devices 21 at the work stations 4 into which the rigid cores are carried, based on identification information from the identification sensors and the data on the attachment conditions J determined from data stored in advance in the storage part 15 (data on the attachment conditions J according to the identified sizes).

In this example, the control unit 17 is provided to each of the member assembly devices 21. The storage part 15 downloads into the control unit 17 the data on the attachment condition J according to the identified size, based on the identification information from the identification sensor. The control unit 17 also controls the member assembly device 21 as a target, based on the data on the downloaded attachment condition J.

FIG. 4A shows conceptually the case where the tire constituent members T are formed on the rigid cores 5 at the first to fourth work stations 4a to 4d.

The third work station 4c will be described as a representative. At the third work station 4c, the member material M8 is attached to the rigid core 5A based on the data on the attachment condition 38A to form the tire constituent member T8A (inner bead core).

Upon completion of the attachment, as shown in FIG. 4B, the rigid core 5A at the third work station 4c is carried to the fourth work station 4d at the downstream side. In addition, the rigid core 5B is carried into the third work station 4c from the second work station 4b at the upstream side.

At that time, the identification sensor provided at the third work station 4c identifies the size B of the carried rigid core 5B and transmits the identification information to the storage part 15. At the storage part 15, the data on the attachment condition J8B for the size B is downloaded into the control unit 17 provided at the third work station 4c based on the transmitted identification information. Accordingly, the data in the control unit 17 is replaced with the data on the attachment condition J8B. Then, the control unit 17 controls the member assembly device 21c based on the data on the attachment condition J8B to form the tire constituent member T8B (inner bead core) for the size Bon the carried rigid core 5B.

As described above, on the green tire formation line in this example, each time the rigid core 5 is carried into the work station 4, the size of the carried rigid core 5 is identified. Then, the member assembly device 21 is controlled based on the data on the attachment condition J according to the size of the carried rigid core 5, to form in sequence the tire constituent member T according to the size of the rigid core 5.

Therefore, it is possible to form green tires of plural sizes simultaneously at random on one line in a reliable and effective manner without causing any confusion.

FIGS. 10 to 13 show examples of the member assembly devices 21.

Figure 10:
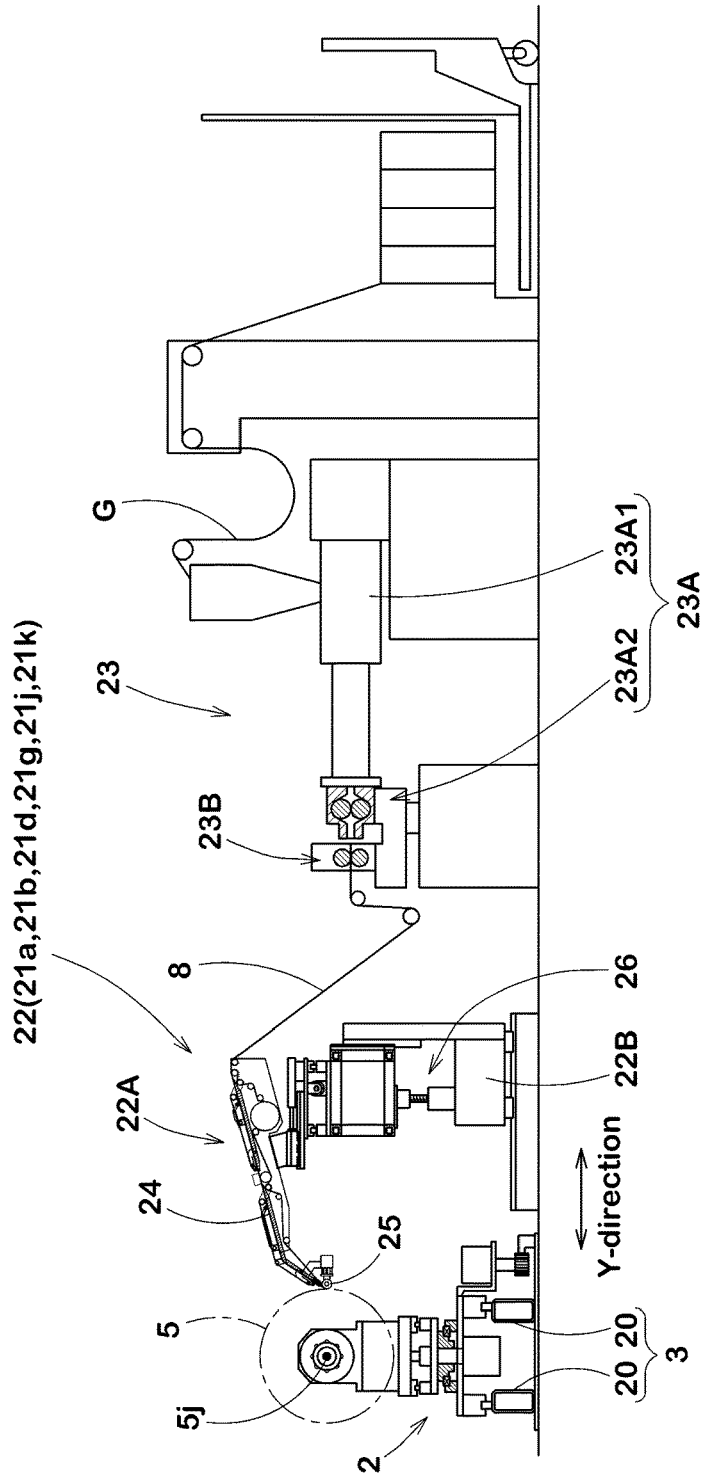
FIG. 10 is a side view of a rubber strip attachment device.
Figure 11:
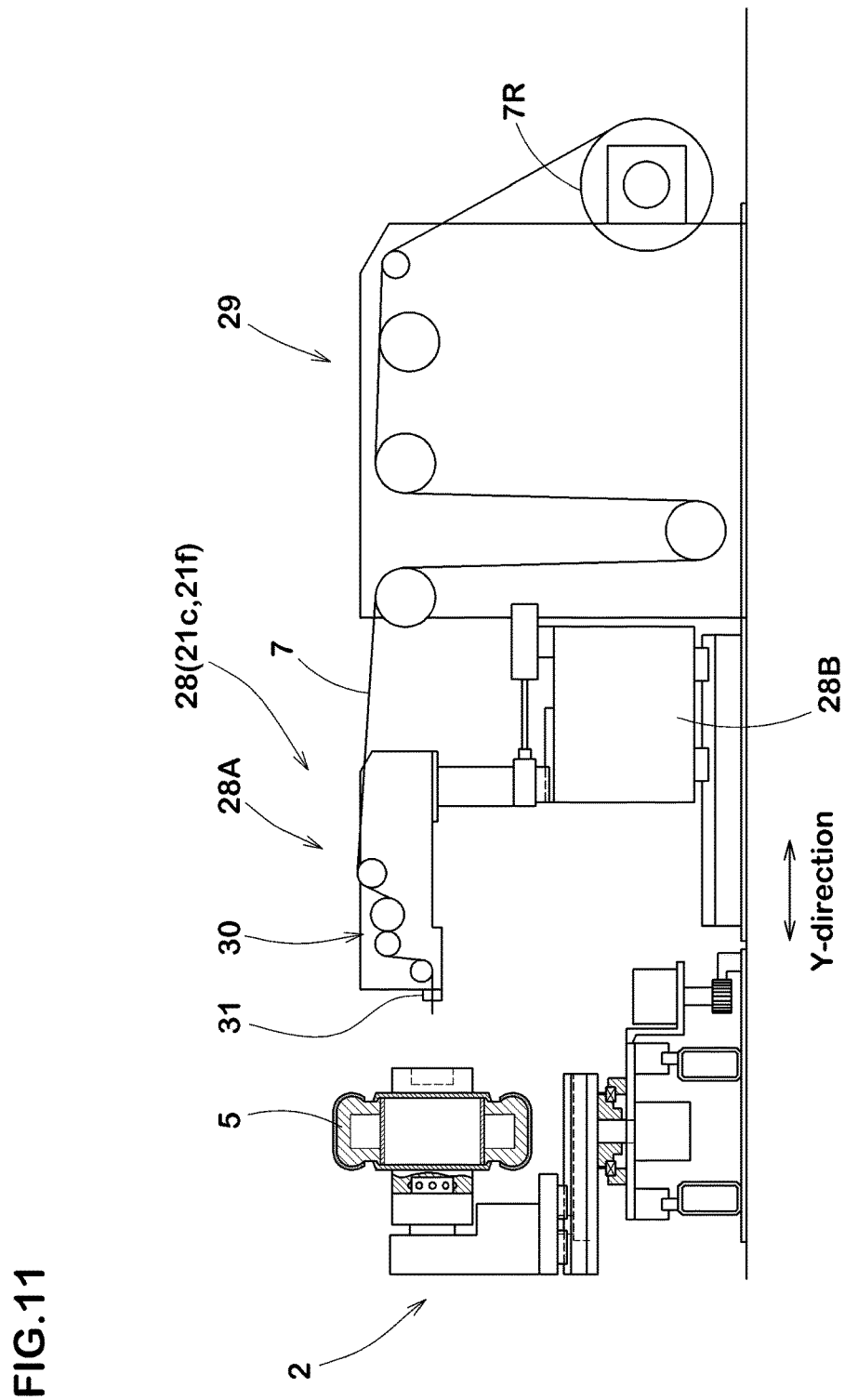
FIG. 11 is a side view of a wire attachment device.
Figure 12:
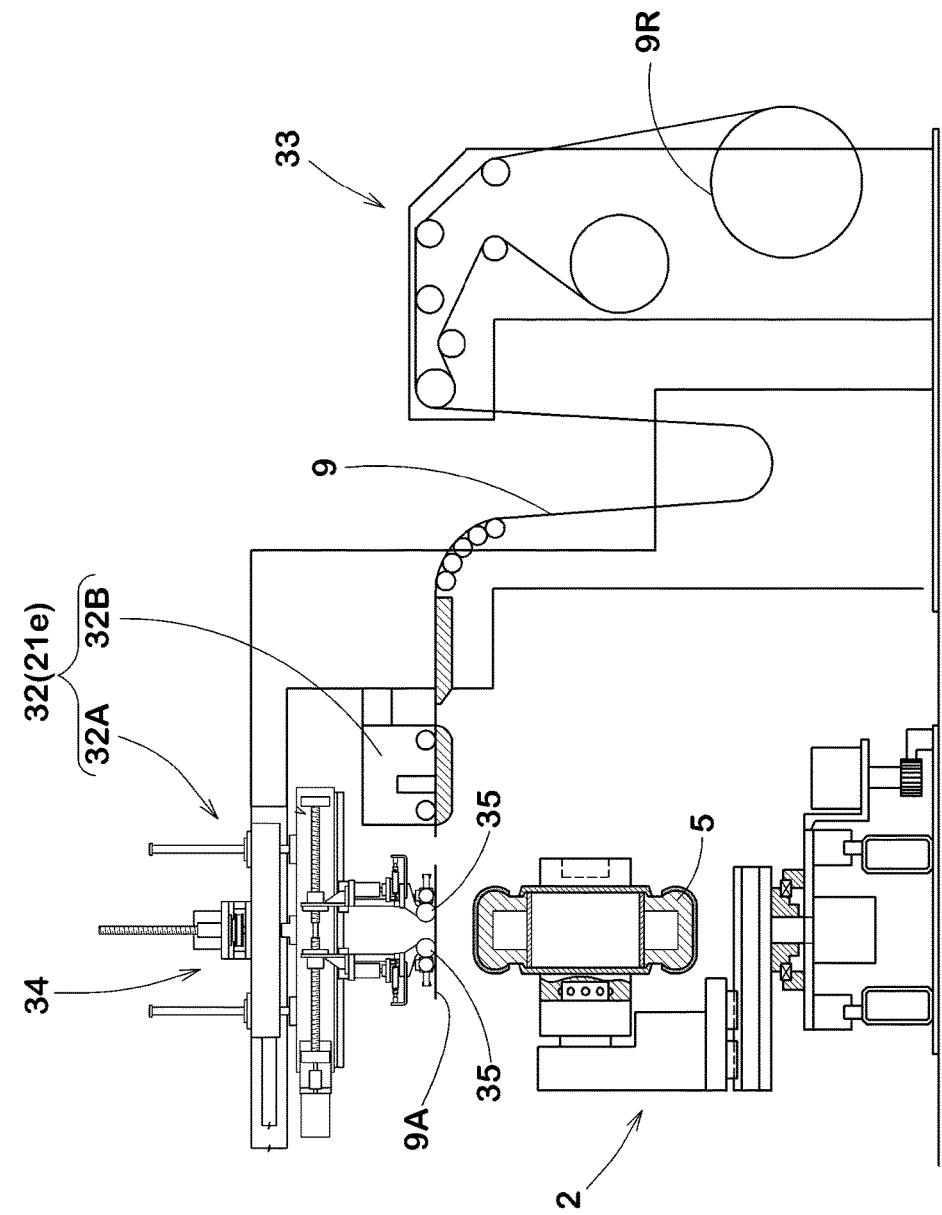
FIG. 12 is a side view of a cord strip attachment device.
Figure 13:
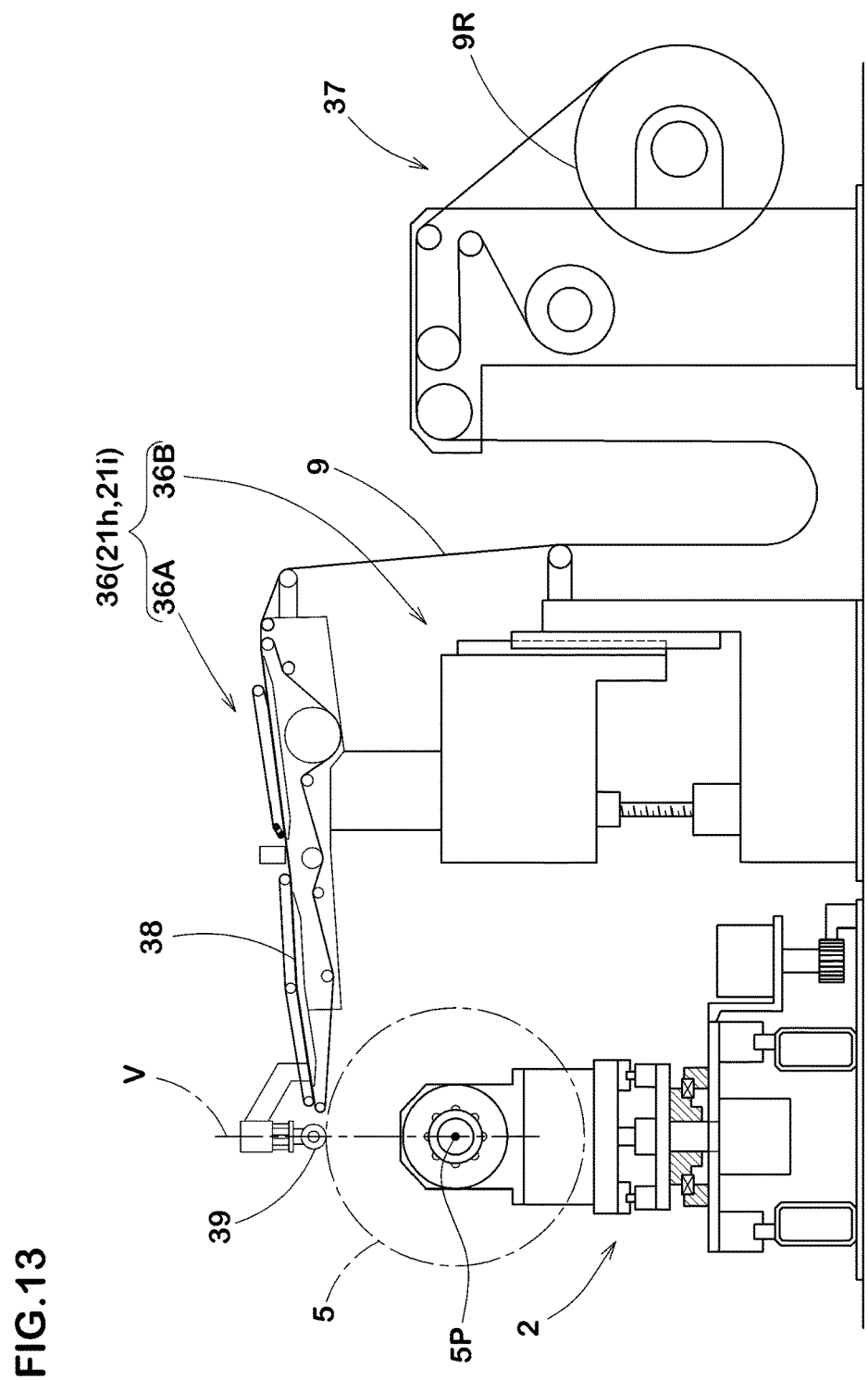
FIG. 13 is a side view of the cord strip attachment device.
Figure 14:
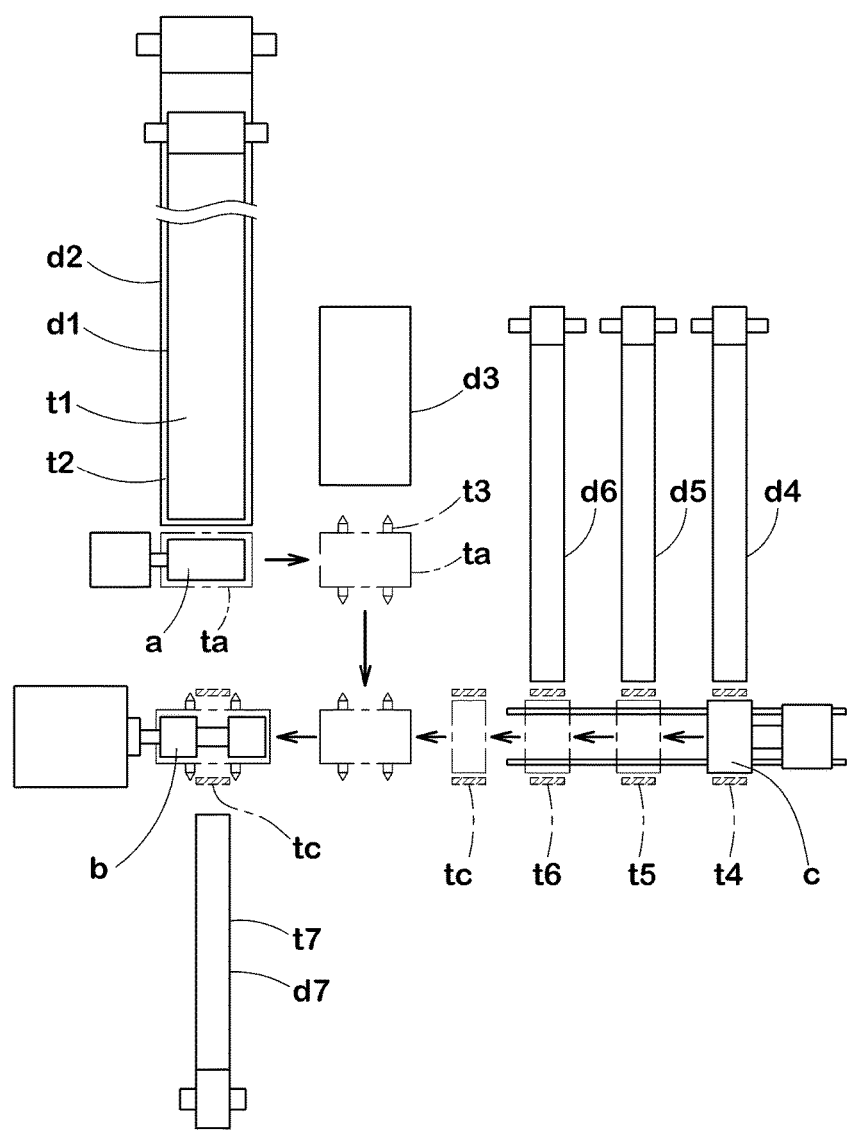
FIG. 14 is a conceptual plane view of a conventional green tire formation line.

Rubber strip attachment device 22 as shown in FIG. 10 can be preferably employed as the member assembly devices 21a, 21b, 21d, 21g, 21j, and 21k. Wire attachment device 28 as shown in FIG. 11 can be preferably employed as the member assembly devices 21c and 21f. Cord strip attachment device 32 as shown in FIG. 12 can be preferably employed as the member assembly device 21e. Cord strip attachment device 36 as shown in FIG. 13 can be preferably employed as the member assembly devices 21h and 21i.

As shown in FIG. 10, the rubber strip attachment device 22 includes an applicator 22A for attachment of a rubber strip and a moving stage 22B that moves the applicator 22A in a Y direction orthogonal to the track 3. The applicator 22A includes a belt conveyor 24 that receives the rubber strip 8 from a rubber strip supply device 23 and conveys the same to the front side in the Y direction and an attachment roller 25 that is disposed at a front end of the belt conveyor 24. The applicator 22A is adjusted in height via an elevating means 26 of a known structure such that a shaft center of the attachment roller 25 is positioned at the same height as the core shaft center 5j of the rigid core 5.

In this example, the rubber strip supply device 23 is a rubber strip formation device composed of a quantitative rubber extruder 23A and a calender device 23B disposed at a front end of the quantitative rubber extruder 23A. In this example, the quantitative rubber extruder 23A includes a gear pump 23A2 at a front end of a screw-type rubber extruder 23A1. The rubber strip formation device can intermittently supply a material rubber G introduced through a rubber inlet according to on/off operations of the gear pump 23A2, while forming the rubber strip 8 with a predetermined cross section shape from the material rubber G.

As shown in FIG. 11, the wire attachment device 28 includes an applicator 28A for attachment of a rubberized wire and a moving stage 28B that moves the applicator 28A in the Y direction. The applicator 28A includes a guide part 30 that is composed of a plurality of guide rollers guiding the rubberized wire 7 received from a wire supply device 29 to the front side in the Y direction and an attachment part 31 that is disposed at a front side of the guide part 30 and has an attachment roller. The guide part 30 can guide the rubberized wire 7 in a zigzag manner to correct a bend in the rubberized wire 7. The attachment part 31 has a grip portion (not shown) that grips a leading end of a roll of the rubberized wire 7 and presses the same against the rigid core 5. In this example, the wire supply device 29 is a reel stand that holds a reel 7R obtained by reeling up the rubberized wire 7 so as to be capable of rewinding.

As shown in FIG. 12, the cord strip attachment device 32 includes an applicator 32A for attachment of a cord strip and a guide part 32B. The guide part 32B cuts the cord strip 9 from a cord strip supply device 33 into the short strip pieces 9A and supplies the same to the applicator 32A. The applicator 32A includes winding-down rollers 35 supported by an elevating means 34. The applicator 32A lowers the winding-down rollers 35 to wind down and attach the short strip pieces 9A to the rigid core 5 along the outline of the rigid core 5. In this example, the cord strip supply device 33 is a reel stand that holds a reel 9R obtained by reeling up the cord strip 9 so as to be capable of rewinding.

As shown in FIG. 13, the cord strip attachment device 36 includes an applicator 36A for attachment of a cord strip and an elevating stage 36B that supports the applicator 36A so as to be capable of moving up and down. The applicator 36A includes a belt conveyor 38 that receives the cord strip 9 from a cord strip supply device 37 and conveys the same to the front side in the Y direction and an attachment roller 39 disposed at a front end of the belt conveyor 38. In this example, the attachment roller 39 is supported so as to move up and down along a vertical line V in which its shaft center passes through the core central point 5P at which the equator surface of the rigid core intersects with the core shaft center 5j. In the case of the belt ply T2, as shown in FIG. 9C, the short strip piece 9B is supplied in the Y direction and attached to the upper surface of the rigid core 5 in which the core shaft center 5j is inclined at an angle of (90°-θ) relative to the Y direction. In the case of the band ply T3, the cord strip 9 is supplied in the Y direction and continuously attached in a spiral manner to the upper surface of the rigid core 5 in which the core shaft center 5j is supported at an angle of 90° relative to the Y direction. In this example, the cord strip supply device 37 is a reel stand that holds the reel 9R obtained by reeling up the cord strip 9 so as to be capable of rewinding.

Next, as shown in FIG. 2, the vulcanization zone Z3 is arranged adjacent to the other lateral side of the square-cornered U-shaped bending track (at which the starting end position P1 and the terminating end position P2 are disposed). The vulcanization zone Z3 includes a vulcanization formation line having a plurality of vulcanization molds 18. The vulcanization molds 18 are used to vulcanize the green tire 6 with the rigid core 5 formed on the green tire formation line.

The vulcanization molds 18 include vulcanization molds of plural sizes for formation of tires different in size. In this example, the vulcanization molds 18 include vulcanization molds 18A, 18B, and 18C for the sizes A, B, and C. Preferably, the ratio among the numbers of the vulcanization molds 18A, 18B, and 18C is equal to the ratio among the numbers of the rigid cores 5A, 5B, and 5C. For example, when the ratio among the numbers of the rigid cores 5A, 5B, and 5C is 3:2:1, the ratio among the numbers of the vulcanization molds 18A, 18B, and 18C is preferably also 3:2:1. This makes it possible to maximize the working rate of the vulcanization molds 18.

The reference numeral 13 in FIG. 2 denotes a transfer cart 13. The transfer cart 13 receives the green tires 6 with rigid cores at the terminating end position P2 and puts the same into the vulcanization molds 18. Provided at the terminating end position P2 is an identification sensor (not shown) that identifies the size of the rigid core 5. Based on the identification information from the identification sensor, the transfer cart 13 puts the green tire 6 with the rigid core into the vulcanization mold 18 of the appropriate size. The transfer cart 13 also delivers the vulcanized tire with the rigid core from the vulcanization mold 18 to a station 14. The station 14 is located lateral to the starting end position P1 to remove the rigid core 5 from the vulcanized tire with the rigid core. The removed rigid core 5 is introduced again into the green tire formation line from the starting end position P1. The vulcanized tire is carried by a carrying cart 16 (shown in FIG. 1) to the inspection and discharge zone Z4 through the vertical one side of the vulcanization zone Z3.

The inspection and discharge zone Z4 is arranged adjacent to the other lateral side of the vulcanized zone Z3. In the inspection and discharge zone Z4, known shipping inspections (for example, inspections for appearance quality, weight balance, uniformity, and the like) are carried out on the vulcanized tire. After that, the vulcanized tire is discharged.

The material storage zone Z1 is arranged adjacent to the one lateral side of the square-cornered U-shaped bending track (at which the vertical track part 3B is disposed). In the material storage zone Z1, the member materials M to be used by the member assembly devices 21 or intermediate materials for formation of the member materials M are stored so as to be capable of being supplied to the member assembly devices 21.

In this example, of the member materials M, the cord strip 9 and the rubberized wire 7 are stored in the material storage zone Z1 as the reels 9R and 7R (shown in FIGS. 11 to 13). Then, the cord strip 9 and the rubberized wire 7 are supplied as the reels 9R and 7R to the work stations 4e, 4h, 4i, 4c, and 4f. Of the member material s M, the rubber strip 8 is stored in the material storage zone Z1 as material rubber G prior to extrusion molding (shown in FIG. 10). Then, the rubber strip 8 is supplied as material rubber G to the work stations 4a, 4b, 4d, 4g, 4j, and 4k. In this example, therefore, the material rubber G is an intermediate material.

The rubber strip 8, cord strip 9, and rubberized wire 7 are formed in appropriate amounts according to the tire production status by a known rubber kneading device and a topping device installed in the material storage zone Z1.

As described above, in the tire manufacturing system of the present invention, it is not necessary to form in advance the tire constituent members T as semi-finished members according to the tire sizes. This makes it possible to reduce the space for the material storage zone Z1. In addition, there is no need for a process line for forming semi-finished members, and the member materials M become less wide. This allows downsizing of the member assembly devices 21. Therefore, the space for the green tire formation zone Z2 can also be reduced.

In addition, the tire constituent members T can be formed according to the size of the rigid core 5 under the attachment conditions J for the member materials M. Thus, tires of plural sizes can be formed simultaneously. This decreases the number of green tires yet to be vulcanized and allows simultaneous usage of vulcanization molds of plural sizes. Accordingly, it is possible to decrease the number of vulcanization molds not used at present.

Since the track is square-cornered U-shaped, the space occupied by the track can be minimized.

The member assembly devices 21 are arranged at the outer peripheral side of the square-cornered U-shaped bending track and along the lateral track parts 3A, 3C, and the material storage zone Z1 is arranged adjacent to the one lateral side of the square-cornered U-shaped bending track. Accordingly, it is possible to form a material supply path 11 from the material storage zone Z1 to the member assembly devices 21 (shown in FIG. 1) by the shortest distance. In addition, the vulcanization zone Z3 is arranged adjacent to the other lateral side of the square-cornered U-shaped bending track. This makes it possible to form a shortest carrying path 12 for the green tires 6 from the green tire formation zone Z2 into the vulcanization zone Z3 (shown in FIG. 1). That is, it is possible to eliminate waste from materials and paths for green tires. In synergy among these advantages, a tire manufacturing plant can be significantly downsized into a space 25 m or less wide and 100 m or less long, for example.

As in the foregoing, a particularly preferred embodiment of the present invention is described in detail. However, the present invention is not limited to the embodiment exemplified in the drawings but can be carried out in various modified modes.

REFERENCE SIGNS LIST

1 Tire manufacturing system
2 Core carrying cart
3 Track
3A, 3C Lateral track part
3B Vertical track part
4 Work station
5 Rigid core
6 Green tire
7 Rubberized wire
8 Rubber strip
9 Cord strip
9a Tire cord
9b Topping rubber
21 Member assembly device
J Attachment condition
M Member material
P1 Starting end position
P2 Terminating end position
T Tire constituent member
T1 Carcass ply
T2 Belt ply
T4 Tread rubber
T5 Side wall rubber
T8, T9 Bead core
TC Cord ply member
TG Rubber member
TW Wire member
Z1 Material storage zone
Z2 Green tire formation zone
Z3 Vulcanization zone
Z4 Inspection and discharge zone

The invention claimed is:

1. A tire manufacturing system, comprising:
a green tire formation zone for forming a green tire;
a vulcanization zone for vulcanizing the green tire;
an inspection and discharge zone for inspecting and discharging the vulcanized tire; and
a material storage zone for storing materials for green tire formation, wherein:
the green tire formation zone has a track and a plurality of work stations arranged along the track, where the green tire is capable of being formed by assembling a respective tire constituent member to an outer surface of a rigid core moving on the track at each of the work stations,
the track is U-shaped such that it consists of three distinct, linear track parts, two of the linear track parts being lateral track-parts arranged coextensively and parallel to each other and the third of the linear track parts being a perpendicular track-part situated perpendicular to the two lateral track parts beyond longitudinal first ends of the two lateral track parts,
each of the work stations includes a respective member assembly device that is capable of forming its tire constituent member by attaching a member material set for each of the respective tire constituent members to the outer surface of the rigid core, under an attachment condition determined according to size of the rigid core, the member assembly devices being arranged at an outer peripheral side of the track and along the two lateral track parts,
the material storage zone is adjacent to the track at a first side which is at the longitudinal first ends of the two lateral track parts and is capable of storing member materials for the member assembly devices,
the vulcanization zone is adjacent to the track at a second side which is opposite to the first side,
the inspection and discharge zone is adjacent to the vulcanization zone at the second side, each of the work stations includes a core carrying cart that holds the rigid core and moves on the track, each of the core carrying carts is capable of sequentially delivering the rigid core to a work station that is located immediately downstream from one in which the core is being held in order to move the rigid core from a starting end position to a terminating end position in the track, the rigid core includes a toroidal core main body and support shaft parts protruding from the toroidal core main body toward both outer sides of a core shaft center concentrically with the core shaft center, and each of the core carrying carts includes:
- a carrying stage that moves on the track in a carrying direction;
- a turning stage that is supported by the carrying stage and turns around a vertical turning shaft center (J);
- a horizontal moving stage that is supported by the turning stage and moves on a horizontal direction line (F) passing through the vertical turning shaft center (J) from a first position (N1) to a second position (N2); and
- a core support stage that is supported by the horizontal moving stage and has a coupling part for coupling to one of the support shaft parts of the rigid core, and said first position (N1) being a position for assembling one of the tire constituent members to the rigid core, and said second position (N2) being a position allowing the system to be capable of delivering the rigid core to an adjacent one of the core carrying carts by moving the horizontal stage of a first one of the core carrying carts, while the system is supporting the core at one end of the core, to its second position (N2) while carrying a first one of the support shaft parts with the coupling part of the first cart, bringing the coupling part of the adjacent cart into contact with another of the support shaft parts such that the core is simultaneously held by the coupling part of the first cart and the coupling part of the adjacent cart, and then releasing the first support shaft part from the coupling part of the first cart while the other support shaft part is held by the coupling part of the adjacent cart such that the core has been directly handed off from the first cart to the adjacent cart.

2. The tire manufacturing system according to claim 1, wherein:
the tire constituent members include:
rubber members including a tread rubber member and a side wall rubber member,
cord ply members including a carcass ply and a belt ply, and
wire members including a bead core.

3. The tire manufacturing system according to claim 1, wherein the vulcanization zone has a vulcanization mold capable of vulcanizing the green tire on the rigid core.

4. The tire manufacturing system according to claim 1, wherein each of the core carrying carts is capable of providing its second position (N2) such that an equator surface of the rigid core is not vertically overlapping with any of the carrying stage, the turning stage, and the horizontal moving stage.

* * * * *